(12) United States Patent
De Smidt et al.

(10) Patent No.: US 11,541,707 B2
(45) Date of Patent: Jan. 3, 2023

(54) CAB CHASSIS VEHICLE AND METHOD OF ASSEMBLING

(71) Applicant: Shem, LLC, Highland Park, IL (US)

(72) Inventors: Marc Ryan De Smidt, Remlap, AL (US); Leonel Teixeira, Birmingham, AL (US); Jacques Blaauw, Trussville, AL (US)

(73) Assignee: Shem, LLC, Highland Park, IL (US)

( * ) Notice: Subject to any disclaimer, the term of this patent is extended or adjusted under 35 U.S.C. 154(b) by 446 days.

(21) Appl. No.: 16/784,791

(22) Filed: Feb. 7, 2020

(65) Prior Publication Data

US 2020/0255068 A1 Aug. 13, 2020

Related U.S. Application Data

(60) Provisional application No. 62/804,035, filed on Feb. 11, 2019.

(51) Int. Cl.
| | |
|---|---|
| *H01B 11/00* | (2006.01) |
| *B60D 1/62* | (2006.01) |
| *B62D 21/17* | (2006.01) |
| *B62D 21/18* | (2006.01) |
| *B62D 33/06* | (2006.01) |
| *B60R 11/04* | (2006.01) |
| *B60J 10/00* | (2016.01) |
| *B60R 16/02* | (2006.01) |
| *B62D 33/077* | (2006.01) |
| *B60D 1/64* | (2006.01) |
| *B60D 1/58* | (2006.01) |
| *B60R 11/00* | (2006.01) |

(52) U.S. Cl.
CPC .................. *B60D 1/62* (2013.01); *B60D 1/58* (2013.01); *B60D 1/64* (2013.01); *B60J 10/45* (2016.02); *B60R 11/04* (2013.01); *B60R 16/0215* (2013.01); *B62D 21/17* (2013.01); *B62D 21/186* (2013.01); *B62D 33/06* (2013.01); *B62D 33/077* (2013.01); *H01B 11/00* (2013.01); *B60R 2011/004* (2013.01); *B60R 2011/005* (2013.01)

(58) Field of Classification Search
CPC ... B60D 1/58; B60D 1/62; B60D 1/64; H01B 11/00; H01B 11/02
USPC ............................................. 307/9.1; 439/34
See application file for complete search history.

(56) References Cited

U.S. PATENT DOCUMENTS

| | | | |
|---|---|---|---|
| 6,483,200 B1 | 11/2002 | Jacobs | |
| 6,857,889 B1 | 2/2005 | Vitale | |
| 7,435,123 B2 | 10/2008 | Franks, Jr. | |

(Continued)

*Primary Examiner* — Dennis H Pedder

(74) *Attorney, Agent, or Firm* — Brooks Kushman P.C.

(57) ABSTRACT

A cab chassis vehicle and a method of assembling a cab-chassis vehicle are provided. A chassis is sub-assembled by connecting a mounting bracket for a truck body to a frame rail via a fastener, installing a chassis-side vehicle harness, and installing a chassis-side body wiring harness. A cab is sub-assembled by installing a connector plate to cover an aperture on an outer panel of the cab, installing a cab-side body wiring harness, connecting the cab-side body wiring harness to the connector plate, and installing a cab-side vehicle harness. The cab is assembled to the chassis to provide a cab-chassis vehicle by connecting the chassis-side body wiring harness to the connector plate, connecting the chassis-side vehicle harness to the cab-side vehicle harness.

21 Claims, 21 Drawing Sheets

(56) References Cited

U.S. PATENT DOCUMENTS

| | | |
|---|---|---|
| 9,330,812 B2 | 5/2016 | Silc et al. |
| 10,965,107 B2 * | 3/2021 | Steinkamp .......... B60R 16/0207 |
| 2004/0194280 A1 | 10/2004 | Borroni-Bird et al. |

* cited by examiner

CAB CHASSIS VEHICLE AND METHOD OF ASSEMBLING

CROSS-REFERENCE TO RELATED APPLICATIONS

This application claims the benefit of U.S. provisional application Ser. No. 62/804,035 filed Feb. 11, 2019, the disclosure of which is hereby incorporated in its entirety by reference herein.

TECHNICAL FIELD

Various embodiments relate to a vehicle or cab chassis and a method of assembling the vehicle or cab chassis.

BACKGROUND

Vehicles such as class 7 and class 8 vehicles are often provided as a cab chassis vehicle by a vehicle original equipment manufacturer (OEM), and then have a selected truck body mounted onto the chassis to functionalize the truck for its intended use. Conventionally, a body builder has fitted the truck body onto the cab chassis, which has required significant modification, disassembly, and reassembly of the existing delivered cab chassis.

SUMMARY

In an embodiment, a cab chassis vehicle is provided with a cab and a chassis. The cab has an outer panel on an underside region of the cab, with the outer panel defining an aperture therethrough. A connector plate is connected to the outer panel and covers the aperture to provide a sealed interface between an interior region of the cab and an exterior region of the cab. A sealing sheet is connected to an outer surface of the outer panel adjacent to the aperture. The sealing sheet extends over an outer surface of the connector plate to act as a barrier for the connector plate from moisture and road debris. The cab has a cab-side body wiring harness having an end supported by the connector plate, and a cab-side vehicle harness. The chassis is connected to the cab and has first and second frame rails, with each frame rail having at least one mounting bracket connected thereto via a fastener, each mounting bracket sized to receive a truck body. The chassis has a chassis-side body wiring harness having an end supported by the connector plate and in electrical communication with the cab-side body wiring harness, and a chassis-side vehicle wiring harness in electrical communication with the cab-side vehicle harness. The chassis-side and cab-side body wiring harnesses are independent from and not connected to the chassis-side and cab-side vehicle wiring harnesses.

In another embodiment, a method of assembling a cab chassis vehicle is provided. A chassis is sub-assembled by connecting at least one mounting bracket to a frame rail of a chassis via an associated fastener, installing a chassis-side vehicle harness, and installing a chassis-side body wiring harness. The mounting bracket is sized to receive a truck body. A cab is sub-assembled by installing a connector plate to cover an aperture on an outer panel of the cab, installing a cab-side body wiring harness, connecting the cab-side body wiring harness to the connector plate, and installing a cab-side vehicle harness. The cab is assembled to the chassis to provide a cab chassis vehicle by connecting the chassis-side body wiring harness to the connector plate, and connecting the chassis-side vehicle harness to the cab-side vehicle harness.

DETAILED DESCRIPTION

Figure 1:
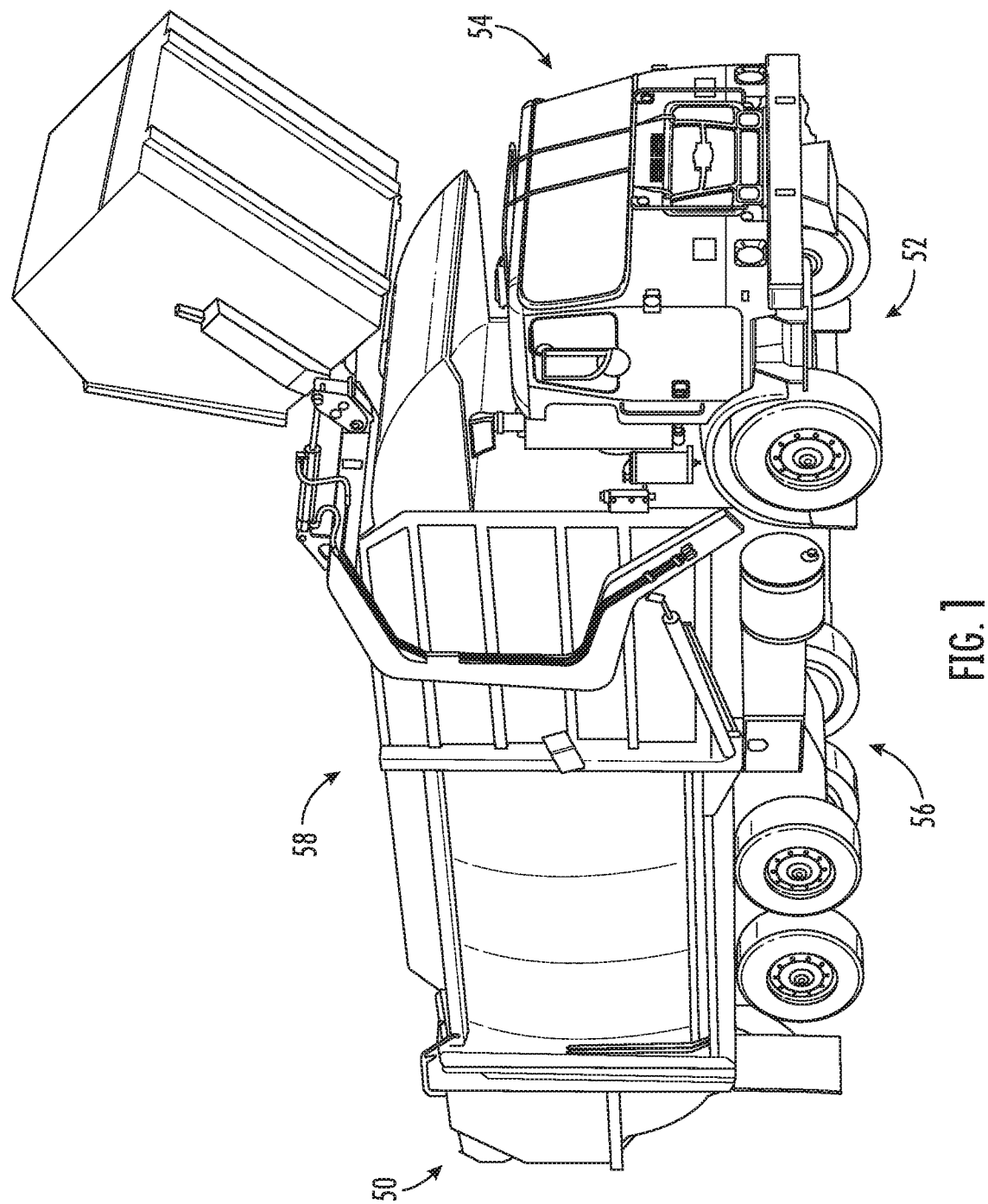
FIG. 1 is a perspective view of a vehicle with a cab chassis according to the present disclosure and a body.

As required, detailed embodiments of the present disclosure are provided herein; however, it is to be understood that the disclosed embodiments are merely examples, and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

According to various embodiments as described herein, a vehicle is provided as a medium or heavy-duty vehicle or truck, and may be further provided as a class 7 or class 8 vehicle, or chassis for use as a class 7 or class 8 vehicle. A class 7 or class 8 vehicle may be considered a heavy-duty truck under the U.S. gross vehicle weight rating (GVWR) system, with a class 7 vehicle having a gross weight limit of 26,001-33,000 pounds, and a class 8 vehicle having a gross weight of 33,001 pounds or more.

An original equipment manufacturer (OEM) as described herein may refer to a vehicle OEM or a chassis OEM. With reference to the specification below, "OEM" may refer to either a vehicle or a chassis OEM. The OEM issues a vehicle certificate of origin or statement of origin, and an associated vehicle identification number (VIN) if the vehicle is certified for on-road use. The OEM may alternatively provide the vehicle for off-road use.

For a chassis OEM, a cab chassis is manufactured. The cab chassis includes an assembled and drivable cab and chassis, with which includes a cab and blank or open chassis rails. The open chassis rails are provided by the OEM without a preassembled flatbed, or other truck body structure. Various truck bodies contemplated for use with the cab chassis are described below in further detail.

The cab chassis may be provided to a body fitter or body builder to provide the desired aftermarket equipment or truck body onto the cab chassis to meet the required function of the vehicle. The body builder is a third party, and is typically located off-site relative to the chassis OEM. The body builder completes the vehicle by providing a truck body or truck equipment onto the chassis rails. Conventionally, and as a part of fitting the body, the body builder disassembles and makes modifications to the cab and chassis. If any errors are made by the body builder during the disassembly, modification, and reassembly process, the integrity of the cab and/or chassis may be compromised, leading to potential quality and reliability issues, and possible down time for the end user.

The body is a truck body and is selected by the end customer or end user to provide a function for the vehicle. The end user may select the body builder to fit a truck body onto a cab chassis from the OEM. With reference to the description below, steps conventionally performed by the body builder and steps performed by the chassis OEM according to the present disclosure are described and compared, with various non-limiting advantages of the present disclosure described.

The vehicle may be provided with various bodies selected to meet specific needs or provide specific functions for the truck. In one example, the vehicle is a refuse or recycling collection truck, and is provided with an automatic or manual sideloader body, a front end loader body, a rear loader body, a roll off or hook lift body, or a manual sort body. The refuse or recycling collection bodies may or may not incorporate a compacting function. In another example, the vehicle is a refueling truck, for example, for use in aviation refueling, and is provided with a refueling body. In other examples, the vehicle is a truck with another body, such as a crane carrying body, a traffic paint striping body, a street sweeper body, a concrete pumping body, or the like.

Conventionally, a body builder modifies the cab chassis and installs the selected body and its associated controls and systems. Depending on the body type, the body builder conventionally modifies the interior and exterior of the cab and modifies the chassis to mount components of the body and its systems, and install various systems to control operation of the body or to monitor the body, including electronics and user interfaces into the cab interior. For example, with a refuse body having a loading arm, the body builder not only has to modify the chassis to mount the body, but also has to run wiring harnesses for controls and sensors, install controls, sensors, and user interfaces. The modification process may involve relocation of chassis components, wheelbases, after-frames, and drive line. The modification process may additionally include disassembling and then re-assembling a majority of the cab interior, cutting holes in or welding to the chassis rails or cab frame, cutting and splicing into existing cab chassis wiring harnesses, and the like.

Various embodiments according to the present disclosure provide for a method of manufacturing and assembling a cab chassis by the OEM and prior to delivery to a body builder to allow for an improved installation of the selected body on the cab chassis to complete the vehicle. With the cab chassis preparing the cab chassis for a selected body installation, a vehicle is provided with increased reliability and quality, and fewer warranty issues or maintenance issues as frame integrity and strength is maintained. Additionally, the vehicle may be provided with a body to the end user or customer at a reduced cost and/or a faster delivery time.

According to one embodiment, the cab chassis OEM assembles the cab and chassis on separate, parallel assembly lines, and then conducts a final assembly of the cab to chassis. The various embodiments below are described for use with this parallel assembly process for a cab chassis. In other embodiments, as also as contemplated by the disclosure, the cab chassis may be assembled on a single assembly line.

FIG. 1 illustrates a vehicle 50 with a cab chassis 52 as produced by a chassis OEM according to an embodiment, with the cab chassis 52 ready for delivery to a body builder for installation of a body 58. The cab chassis 52 has a cab 54 and a chassis 56. The cab 54 may be provided in a cab-over-engine configuration as shown, and has a cab interior for the vehicle operator. The body 58 is connected to the chassis 56 of the cab chassis 52. A commercial front loading refuse body is illustrated as a non-limiting example of a body 58; and other bodies are also contemplated for use with the cab chassis 52 as described above.

Figure 2:
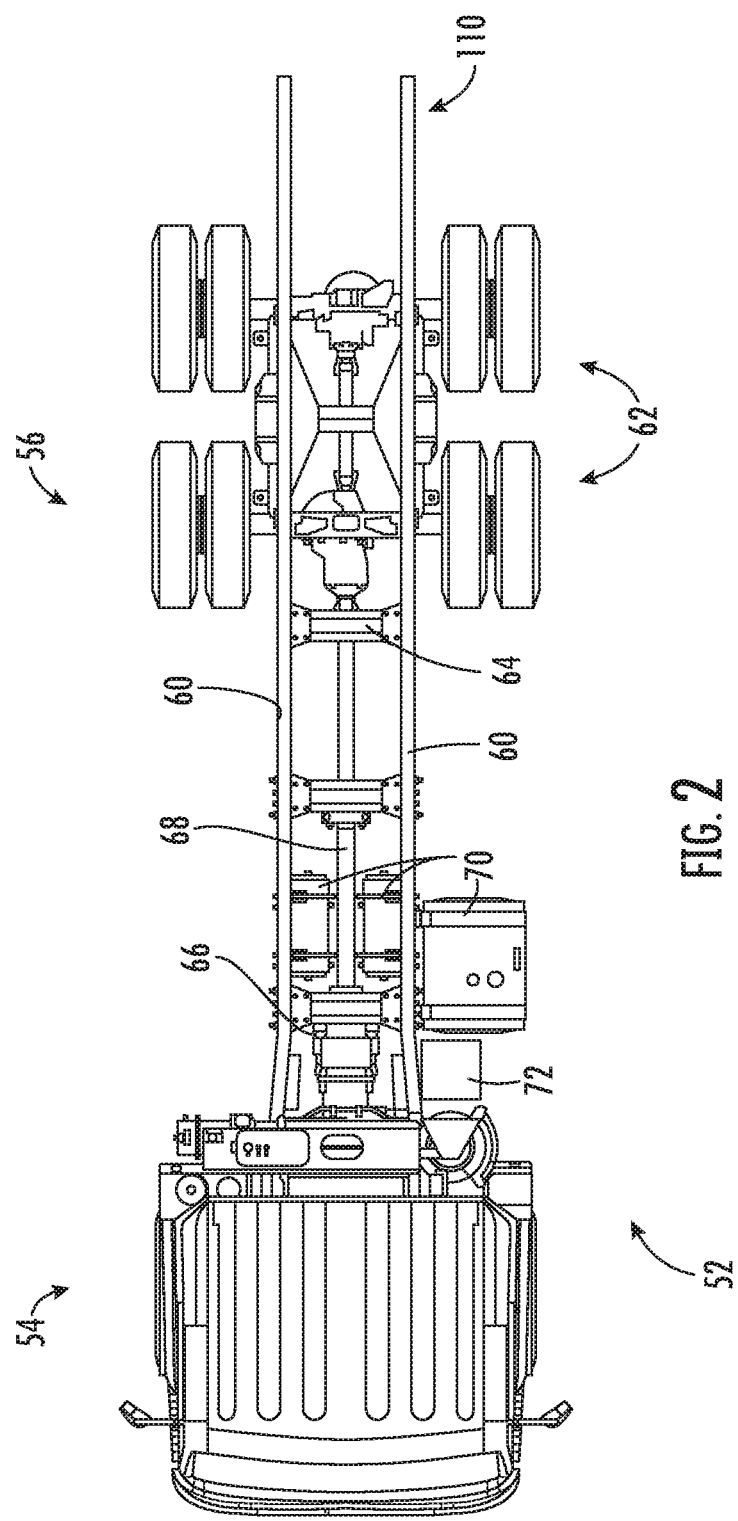
FIG. 2 is a top view of a cab chassis according to the present disclosure.
Figure 3:
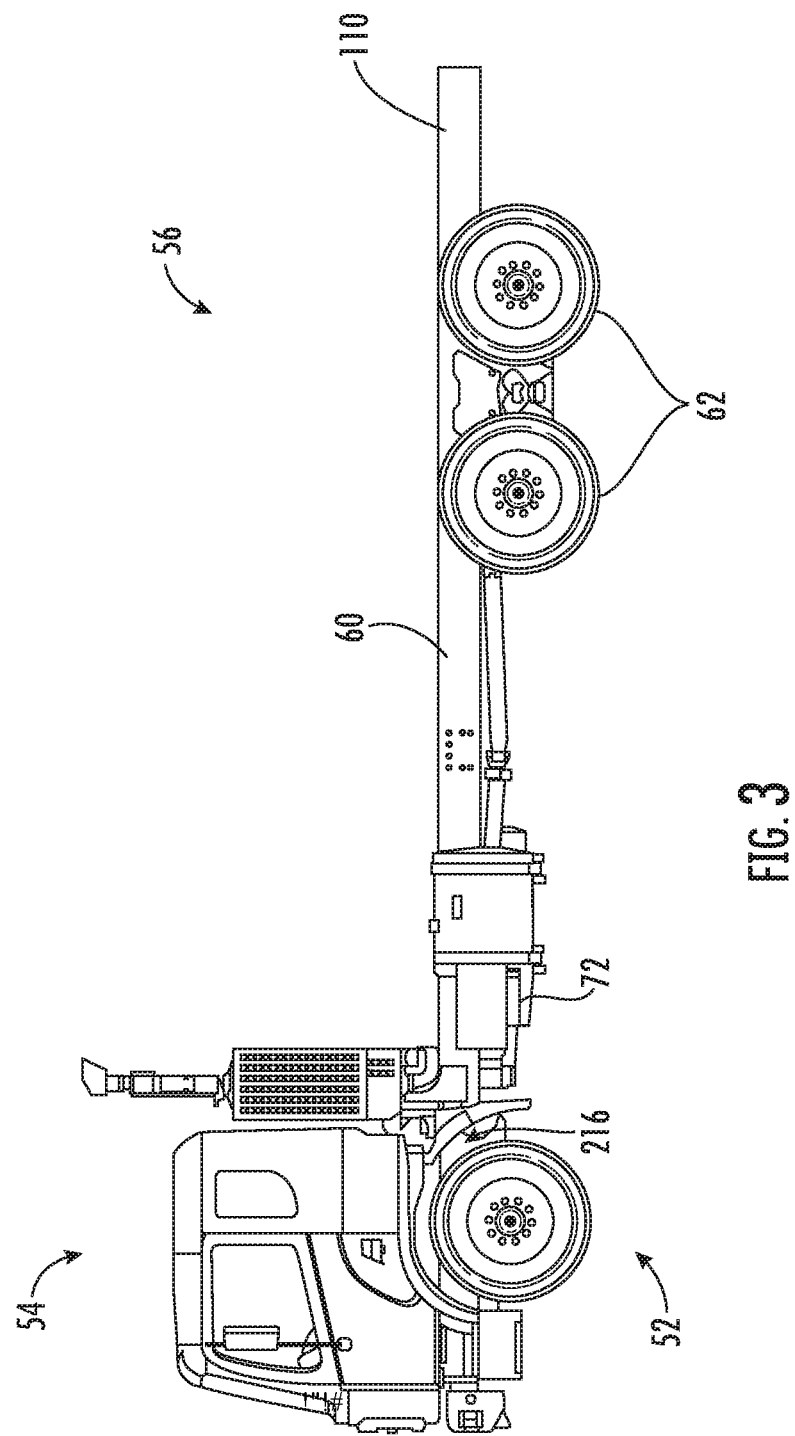
FIG. 3 is a left side view of the cab chassis of FIG. 2.
Figure 4:
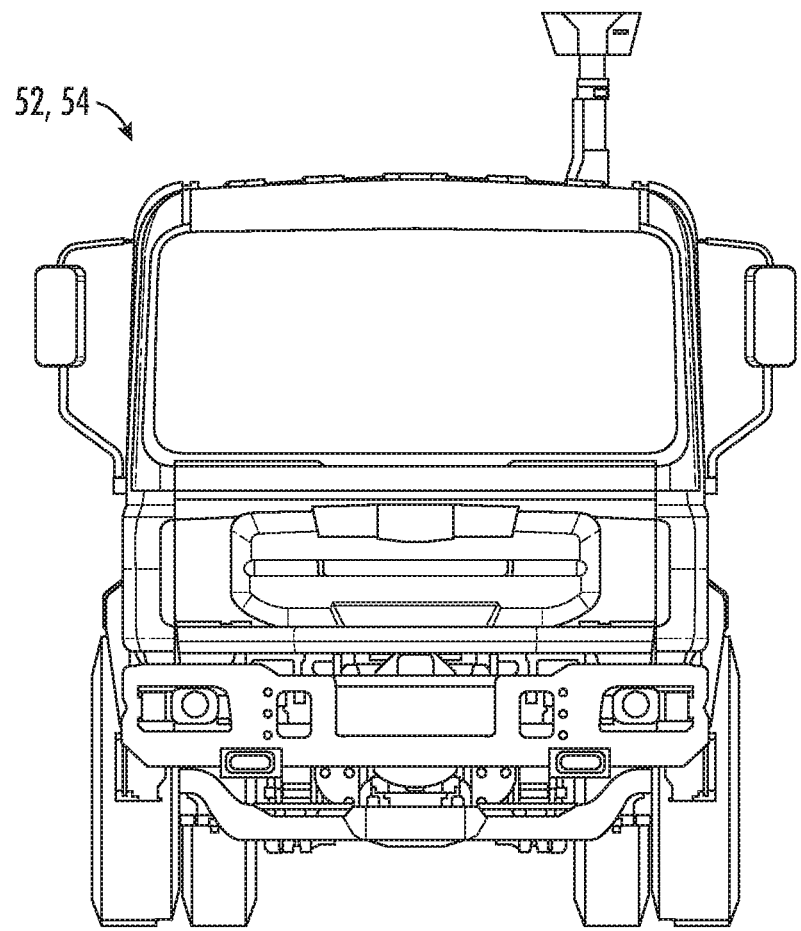
FIG. 4 is a front view of the cab chassis of FIG. 2.

FIGS. 2-4 illustrate a cab chassis 52 according to an embodiment. FIGS. 2-4 illustrate a Class 7 vehicle for example purposes, and the present disclosure is likewise applicable to a Class 8 vehicle. The cab chassis 52 may be used with the vehicle 50 of FIG. 1. The chassis 56 may be provided with a pair of frame rails 60 that extend fore and aft as shown. The cab chassis 52 includes and supports vehicle systems such as driveline, suspension, braking, steering, safety, and the like. The vehicle may be provided with a conventional engine, such as a diesel engine, or may be provided with a compressed natural gas engine. The engine is positioned under the cab 54 for the cab-over configuration as shown. Wheel bases 62 are provided to support the frame rails 60 over the underlying road surface. The frame rails 60 may have cross-support members 64 located at an intermediate location along the frame rails between the front and the rear ends of the frame rails. A rear cross member or rear close out may additionally be provided, as is further described below and based on the intended body 58 for use with the cab chassis 52. Conventionally, the cab chassis is delivered to a body builder without a rear cross-member between the frame rails 60, as is shown in FIG. 2.

The transmission 66 and driveline 68 are shown, and transmission 66 may be provided with a power take off for use in driving body 58 systems or components. The braking system may be provided as a pneumatic system, and air tanks 70 associated with the vehicle are also shown, and may be further used to connect to the body as well as the cab chassis. Various cables, wiring harnesses, and pneumatic lines extend along and are bundled to the frame rails 60 to connect components of the cab chassis, and these may be run along an inside surface of a frame rail 60. Furthermore, at least some of the cables, wiring harnesses, and/or pneumatic lines may extend into the interior of the cab 54.

The body 58 as shown in FIG. 1 may be rotatably mounted to the frame rails 60. The body 58 includes a control system for controlling the body including a control input for the front loading arm, and the body includes user inputs such as joysticks and switches that are positioned within the cab 54. The body 58 also includes sensors and cameras that are routed to an associated user display system in the cab via associated cables. Furthermore, the body 58 may need to connect to the pneumatic system of the cab chassis 52, as well as the electrical system, e.g. to the cab chassis battery, e.g. at battery box 72.

Figure 5:
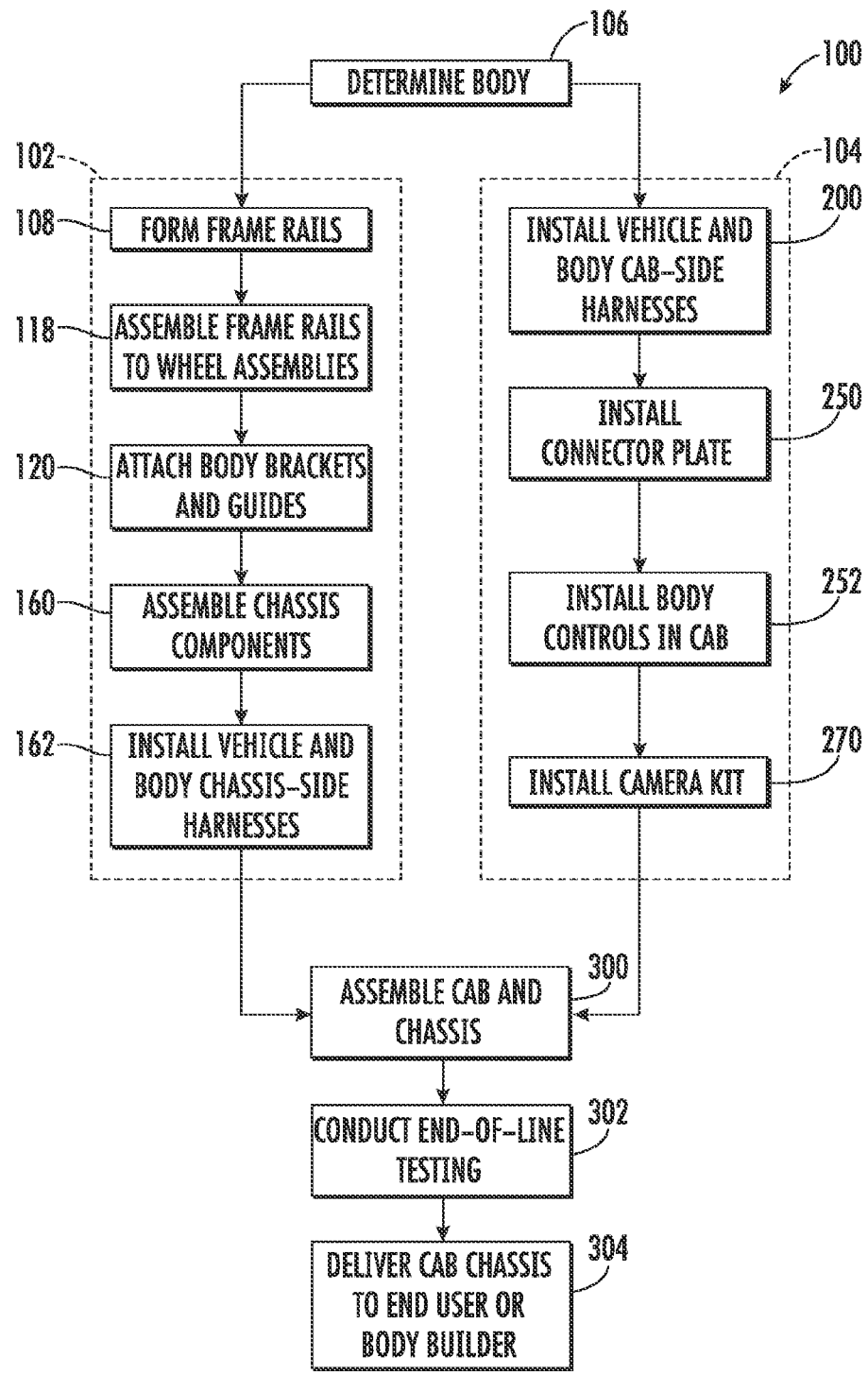
FIG. 5 is a flow chart illustrating a method of assembling the cab chassis of FIGS. 1-4.

FIG. 5 illustrates a method 100 for assembling the cab chassis 52 at the cab chassis OEM prior to and for delivery to the body builder. The cab chassis 52 is prepped by the cab chassis OEM for body installation based on a selected body 58 type. In assembling and preparing the cab chassis 52 at the cab chassis OEM facility, the cab chassis OEM performs various engineering, manufacturing, assembly, and installation steps that were previously performed by the body builder to result in an improved cab chassis 52 and method of assembling the cab chassis 52 according to the present disclosure. In other examples, various steps may be omitted, added, rearranged into another order, or performed sequentially or simultaneously. Although the method 100 is described with respect to a refuse truck, the method may likewise be applied for use with a cab chassis 52 that interfaces with other body 58 types or styles. Steps of the method 100 associated with the chassis sub-assembly method are indicated by box 102. Steps of the method associated with the cab sub-assembly method are indicated by box 104. Steps 300, 302, 304 of the method are associated with the final cab chassis assembly.

At step 106, the end user or customer provides instructions as to the specifics of the planned body 58 for installation onto the cab chassis 52. The end user or customer may provide the instructions to the cab chassis OEM as to the body 58 type and style planned for use with the cab chassis 52, and also provide an indication of the body builder that the cab chassis 52 is to be delivered to upon completion. In some examples, the OEM may use a database with body standard and optional content as selectable in an order system by the end user, together with the cab chassis standard and optional content, for the end user to make a complete and integrated selection for the vehicle. The chassis OEM works with the specified body builder to determine the mechanical, electrical, and systems technical requirements for the selected body 58 in order for the selected body 58 to be mounted to the cab chassis 52.

At step 108, the chassis frame rails 60 are formed for use with a selected body type and style as engineered by the OEM. A body builder may provide input or additional engineering guidance to the OEM. In various embodiments, forming the frame rail includes the OEM ordering the frame rails to a specification from a chassis frame rail supplier with the frame rails formed to the specification as described herein with respect to step 108 and for use in the assembly of the cab chassis according to FIG. 5.

Figure 6:
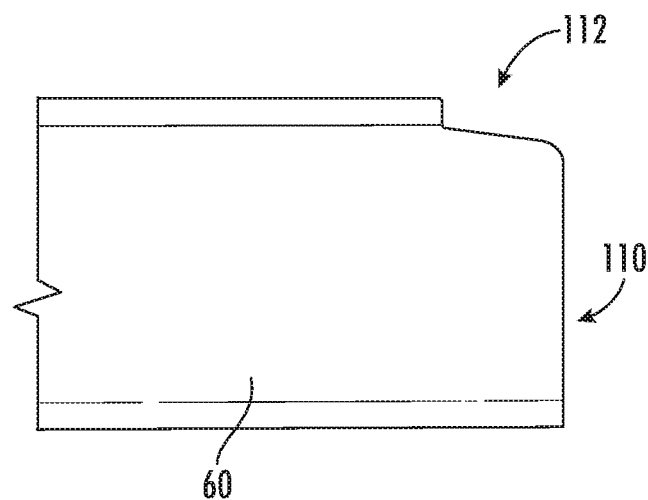
FIG. 6 is a partial side view of a frame rail with a profile according to an embodiment and formed using the method of FIG. 5.
Figure 7:
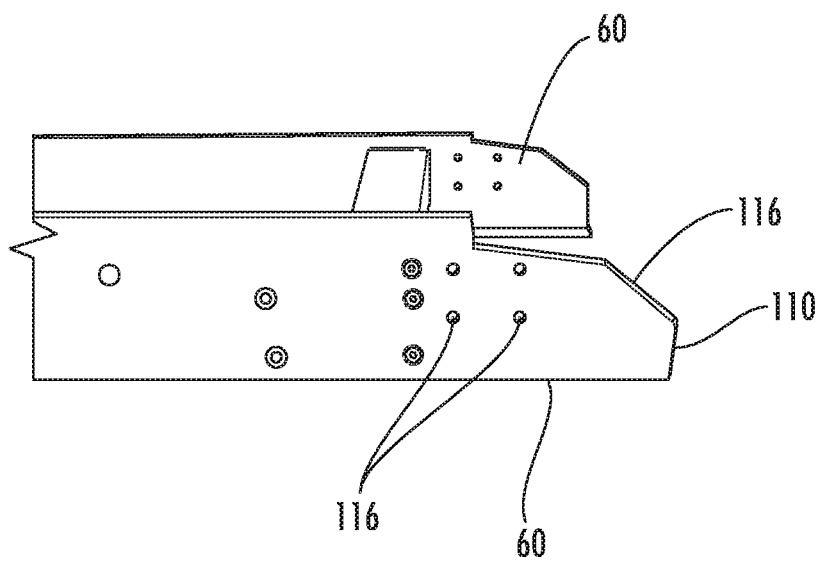
FIG. 7 is a partial perspective view of a portion of a chassis having first and second frame rails with another profile according to an embodiment.

The frame rails 60 are cut to a specified length based on the planned body 58 for the cab chassis 52. Additionally, the rear end 110 of each frame rail 60, or the end of the frame rail opposite to the cab, may be cut or trimmed to a specified profile. In one example, the frame rail 60 is cut to a specified length and the profile 112 is a chamfer, as shown in FIG. 6. In another example, the profile 114 is a double chamfer, as shown in FIG. 7. In further examples, the profile of the frame rail may have other shapes. Both frame rails 60 may be cut to the same profile, or the frame rails may be cut to different profiles.

The frame rails 60 are also drilled, punched, or otherwise machined with holes or apertures 116 in a selected pattern at various locations along the length of the rail 60. The frame rails may require apertures 116 for mounting chassis components, which may be in a standardized location for the chassis, and may also require apertures 116 for mounting body related brackets, guides, and other components. The locations for the apertures 116 may be understood to one of ordinary skill in the art with reference to FIGS. 7-16. The apertures 116 for mounting the brackets for the body 58 and its related systems and components may be provided in a specific pattern that is based on a specific body type and style associated with a specified body builder.

After the apertures 116 are formed in the frame rails 60 for both the chassis and body components, the frame rails 60 are heat treated. In one example, the frame rails 60 are formed from steel, and the heat-treating process hardens and stress relieves the steel. The cutting and forming steps for apertures and profiles on the frame rails 60 are performed prior to any heat treating of the frame rails. Furthermore, the cutting and forming steps are performed prior to any painting or coating of the frame rails 60. As such, any cutting is performed on unhardened steel, and there are no raw or uncoated edges on the frame rails 60 without paint.

Conventionally, these cutting and forming steps were performed by the body builder on heat treated and painted frame rails on the finished cab chassis, leading to difficulties in cutting, difficulties in precisely and accurately locating the holes or profiles, and resulting in raw edges without paint or a coating, or with a different paint than the remainder of the frame rail. The frame rail shown in FIG. 7 was cut after the cab chassis had left the chassis OEM, and the raw and uneven edges of the profile and the mounting apertures may be seen from the figure. Alternatively, the body builder may directly weld the mounting bracket and other body components onto the frame rails, and not cut hole patterns for components such as mounting brackets and plates. The body components for connection to the frame rails are further described below. Welding and/or cutting heat treated steel rails may create additional stress risers, or be difficult to perform based on the hardened material of the rails. Furthermore, the chassis OEM would prefer that the frame rails are not welded or cut after the cab chassis is assembled as a wiring harness, pneumatic line, or the like mounted to the frame rails may be adjacent to the weld or cut location, and welding the frame rails may also require specific battery disconnect procedures that may otherwise lead to possible damage to various electronic equipment and/or control modules on the vehicle.

At step 118, the chassis OEM then assembles the frame rails 60 to the wheel assemblies 62. The location of the wheel assemblies may be in a standard configuration for the cab chassis, or may be positioned in a specific location by the chassis OEM based on the body 58 that is intended for use with the cab chassis, for example, when a specific weight distribution is required or there are interference issues with the planned body.

At step 120, various mounting, guide, tie down, sub-frame mounting, and other brackets for mechanically coupling the body 58 and its components to the chassis 56 are provided and attached to the frame rails 60 by the chassis OEM. The chassis OEM may additionally attach brackets for mounting body components, such as hydraulic tanks, to the frame rails 60. The brackets may be provided to the chassis OEM by the body builder, or the chassis OEM may manufacture some or all of the brackets based on specifications for body mounting points provided by the body builder.

Figure 8:
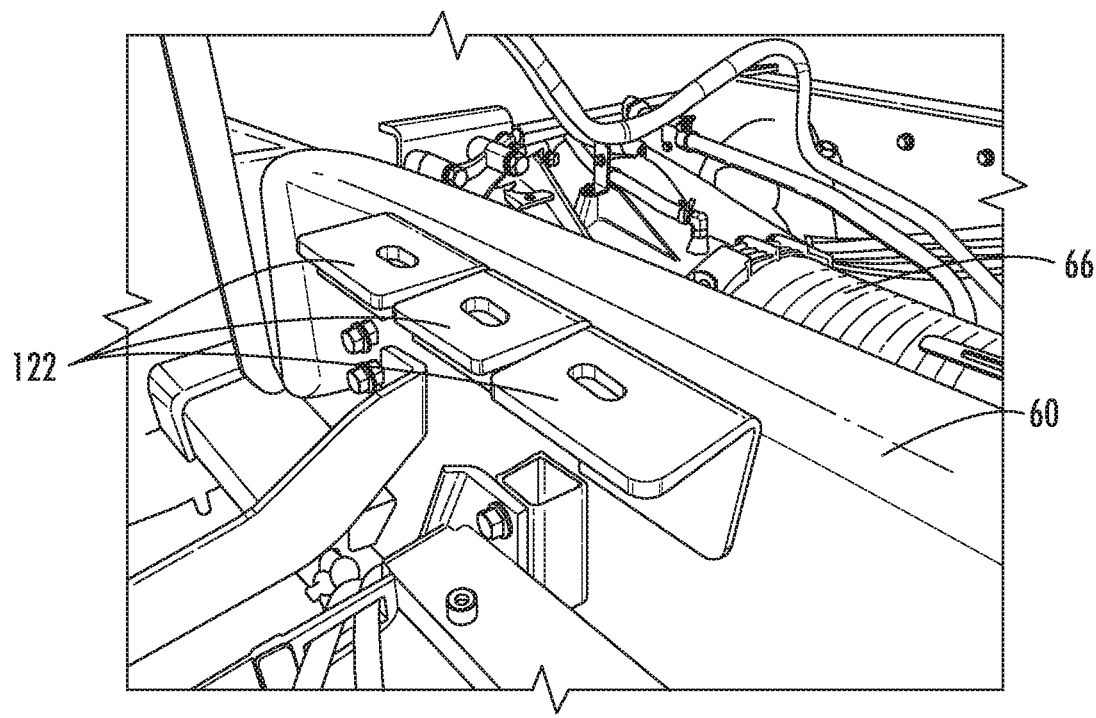
FIG. 8 is a partial top perspective view of the chassis illustrating a series of body brackets according to an embodiment and assembled using the method of FIG. 5.
Figure 9:
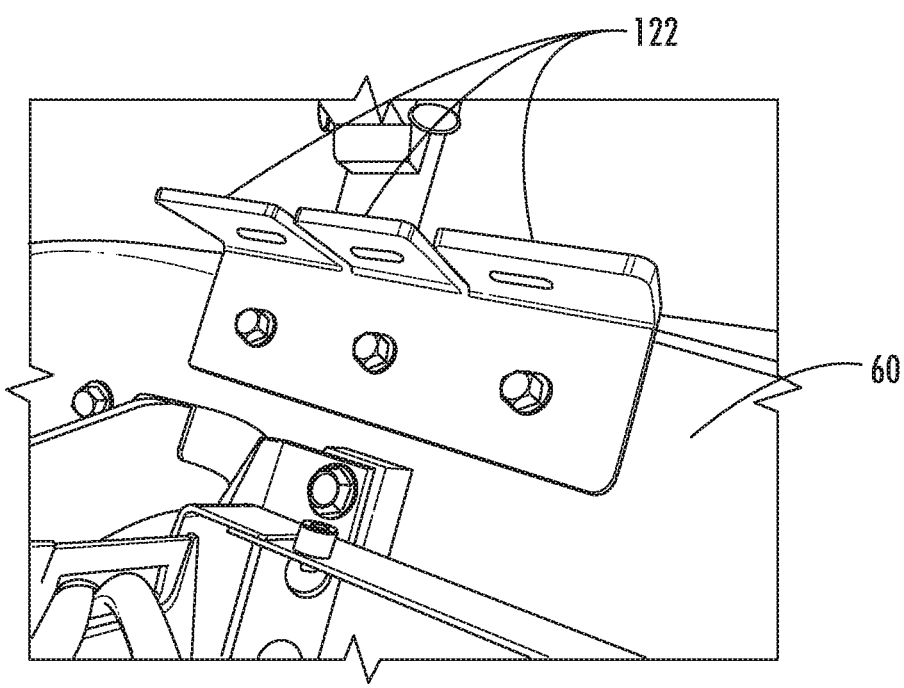
FIG. 9 is a partial bottom perspective view of the chassis and the series of brackets of FIG. 8.
Figure 10:
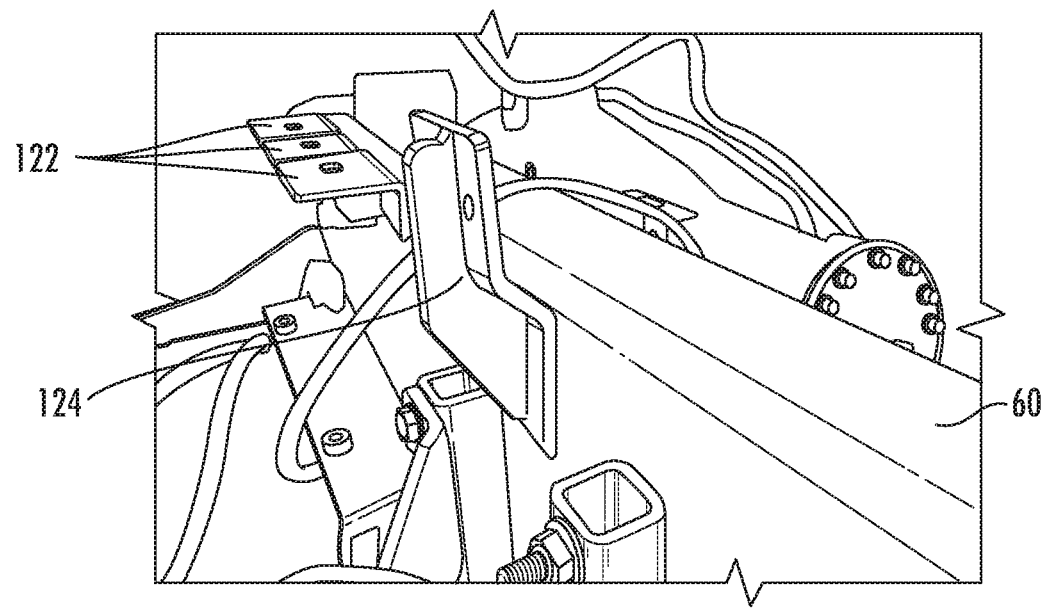
FIG. 10 is a partial top perspective view of the chassis of FIG. 8 illustrating a guide bracket according to an embodiment and assembled using the method of FIG. 5.

FIGS. 8-9 illustrate body tie down brackets 122 on one side of the chassis, and on an out-board side of the frame rail 60 adjacent to a forward end of the frame rail. FIG. 10 illustrates the body tie down brackets of FIGS. 8-9 as well as a guide bracket 124 on one side of the chassis, and on an out-board side of the frame rail 60 adjacent to a forward end of the frame rail. The other frame rail 60 may be provided with corresponding brackets 122, 124 on its out-board side. Each of the body tie down brackets 122 and the guide brackets 124 is bolted to the frame rail via the mounting apertures 116 provided in the frame rails 60. Note that FIGS. 8-16 are photographs taken from a completed cab chassis 52, and in some embodiments, the transmission, wiring harnesses, and other components may not be assembled onto the chassis until after the brackets and other mounting points are connected at step 120.

The body tie down brackets 122 as shown in FIGS. 8-10 are used to clamp the body 58 onto to the chassis 56 and frame rails 60 via the mounting face extending outwardly from the frame rail. The body tie down brackets 122 may be provided as an L-shaped bracket as shown, or in another shape based on the required attachment to the body. The guide brackets 124 each have guide members that extend outwardly and upwardly form the frame rails 60 as shown in order to align the body 58 relative to the chassis 56 if the body is lifted away from the chassis, for example, during a service event, or the like.

Figure 11:
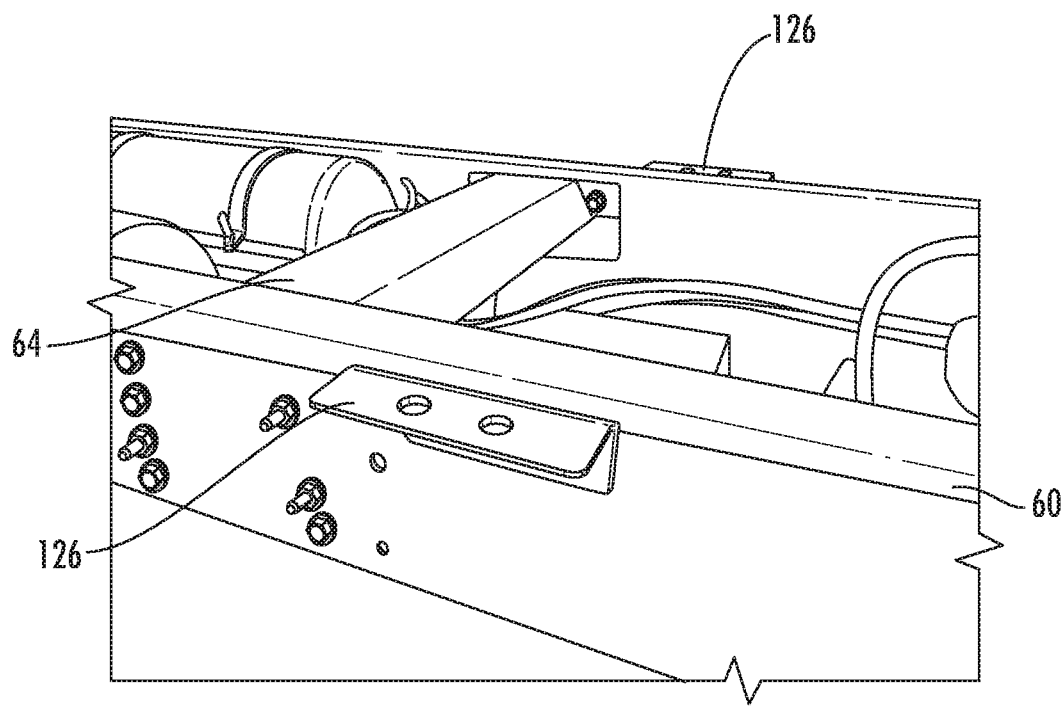
FIG. 11 is a partial top perspective view of another chassis illustrating another body bracket according to another embodiment and assembled using the method of FIG. 5.

FIG. 11 illustrates body tie down brackets 126 according to another embodiment, and for use with a different body than the brackets 122, 124 shown in FIGS. 8-10. The body tie down brackets 126 are provided in an intermediate region of the frame rails 60, and provide an additional mounting or attachment point for the body onto the chassis.

Figure 12:
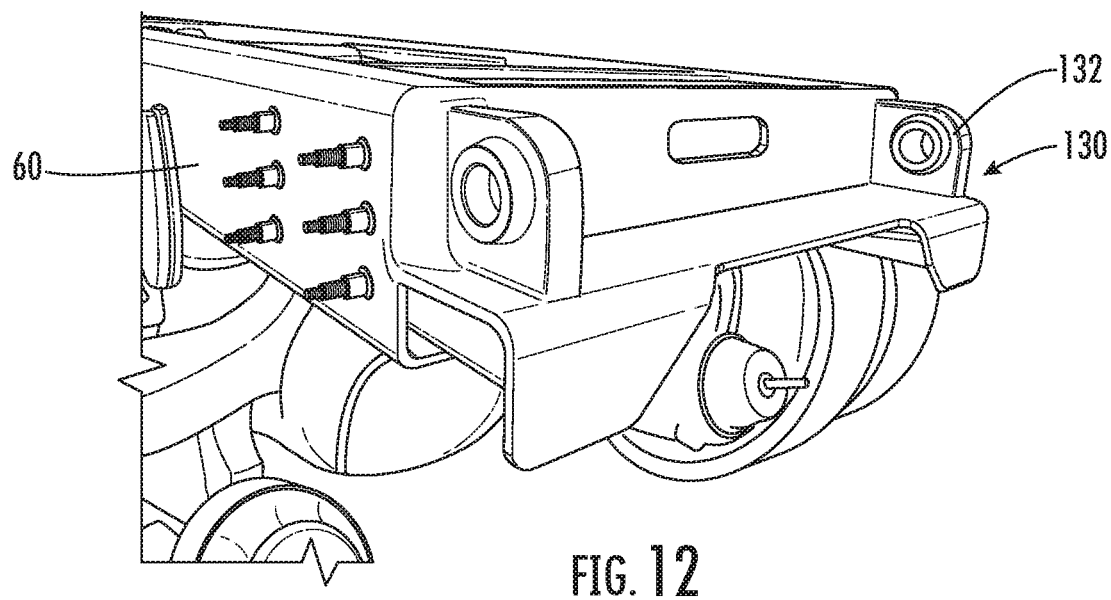
FIG. 12 is a partial perspective view of a chassis with a rear cross-member with a body mount according to an embodiment and assembled using the method of FIG. 5.
Figure 13:
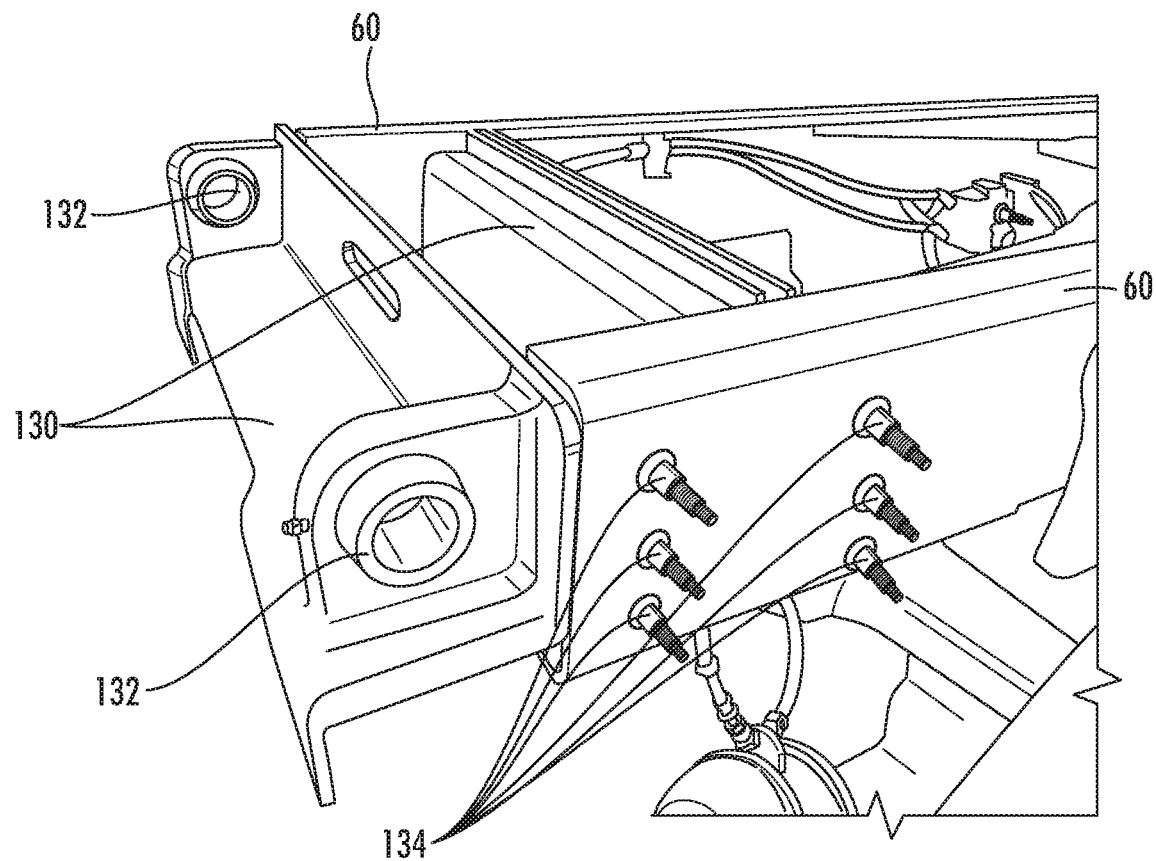
FIG. 13 is another partial perspective view of the chassis and the rear cross-member of FIG. 12.

FIGS. 12-13 illustrate a rear closeout cross-member 130 with a rear body mount 132. The rear cross-member 130 extends transversely across the chassis and between the rear end regions 110 of the first and second frame rails 60. The rear cross-member 130 as shown in FIGS. 12-13 has a rear body mount 132 incorporated into and welded to the cross-member. In one example, the rear body mount 132 may allow the body 58 to rotate relative to the chassis, for example, in order to empty or dump a refuse body.

The rear cross-member 130 as shown is sized to extend between the inner faces of the two frame rails 60. The cross-member 130 has first and second mounting plates that define a series of apertures that are aligned with corresponding apertures on the frame rails 60 to connect the cross-member to the chassis. In the example shown, the rear cross-member 130 is connected to the frame rails 60 using six fasteners 134 on each side, although other numbers and/or types of fasteners are also contemplated.

The rear cross-member 130 may have an additional cross support beam as shown to add structural rigidity to the rear section of the chassis 56.

Figure 14:
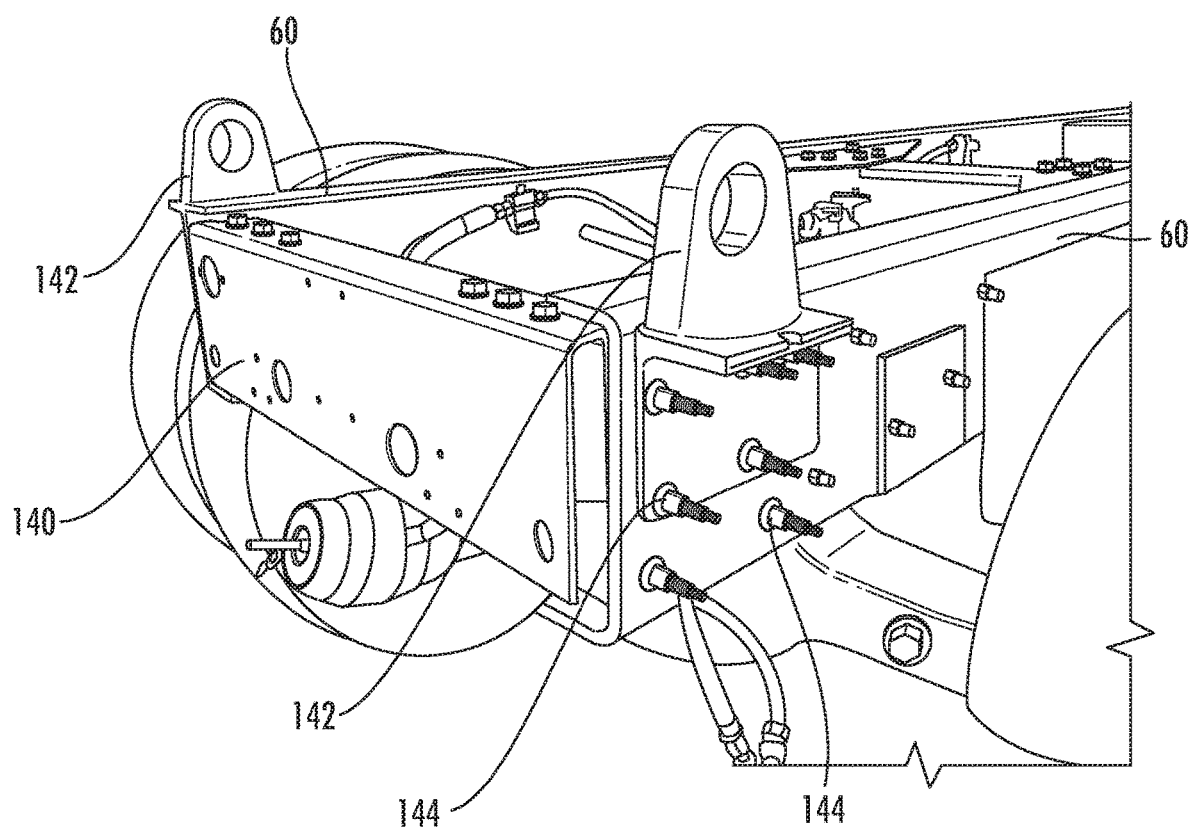
FIG. 14 is a partial perspective view of another chassis with another rear cross-member and body mounts according to another embodiment and assembled using the method of FIG. 5.

FIG. 14 illustrates a rear closeout cross-member 140 with rear body mounts 142 according to another embodiment. The rear cross-member 140 extends transversely across the chassis and between the rear end regions 110 of the first and second frame rails 60. First and second rear body mounts 142 are also provided and are connected to an outboard side of the first and second frame rails 60. In one example, the rear body mounts 142 may allow the body 58 to rotate relative to the chassis, for example, in order to empty or dump a refuse body.

The rear cross-member 140 as shown is sized to extend between the inner faces of the two frame rails 60. The cross-member 140 has first and second mounting plates that define a series of apertures that are aligned with corresponding apertures on the frame rails 60 to connect the cross-member to the chassis. The first and second rear body mounts 142 likewise have a series of apertures that align with corresponding apertures on the frame rails and on the rear cross-member 140. In the example shown, the rear cross-member 140 and the first and second rear body mounts 142 are connected to the frame rails 60 using fasteners 144 on each side, with each frame rail 60 positioned between the rear cross-member 140 and an associated one of the rear body mounts 142.

Figure 15:
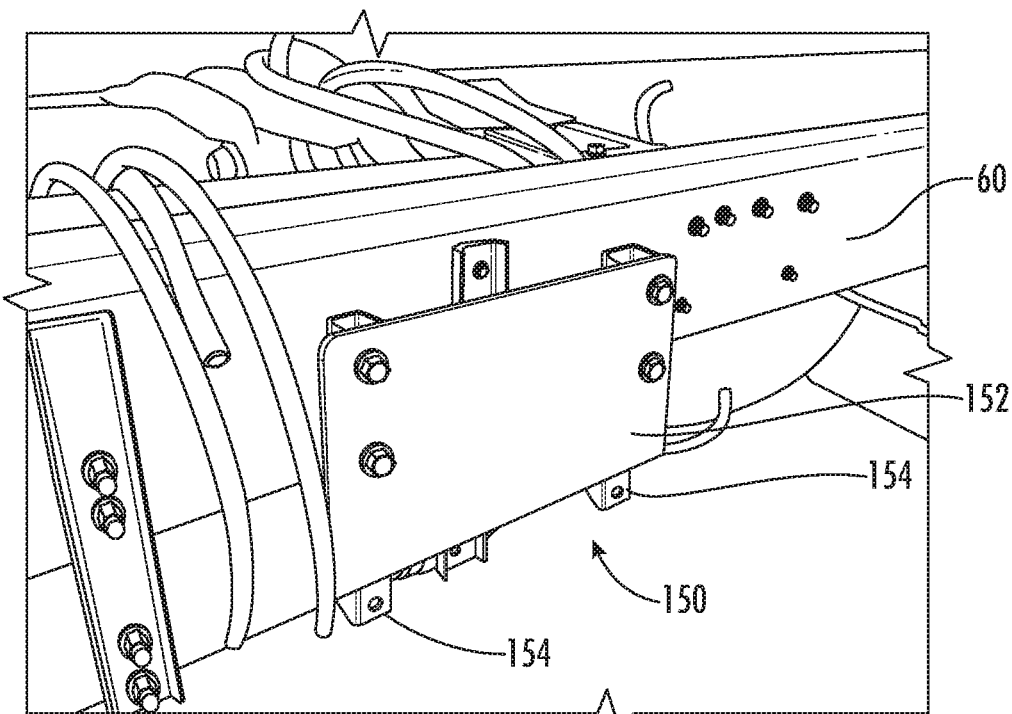
FIG. 15 is a partial perspective view of a chassis with a mounting plate for a body component such as a fuel management module according to an embodiment and assembled using the method of FIG. 5.
Figure 16:
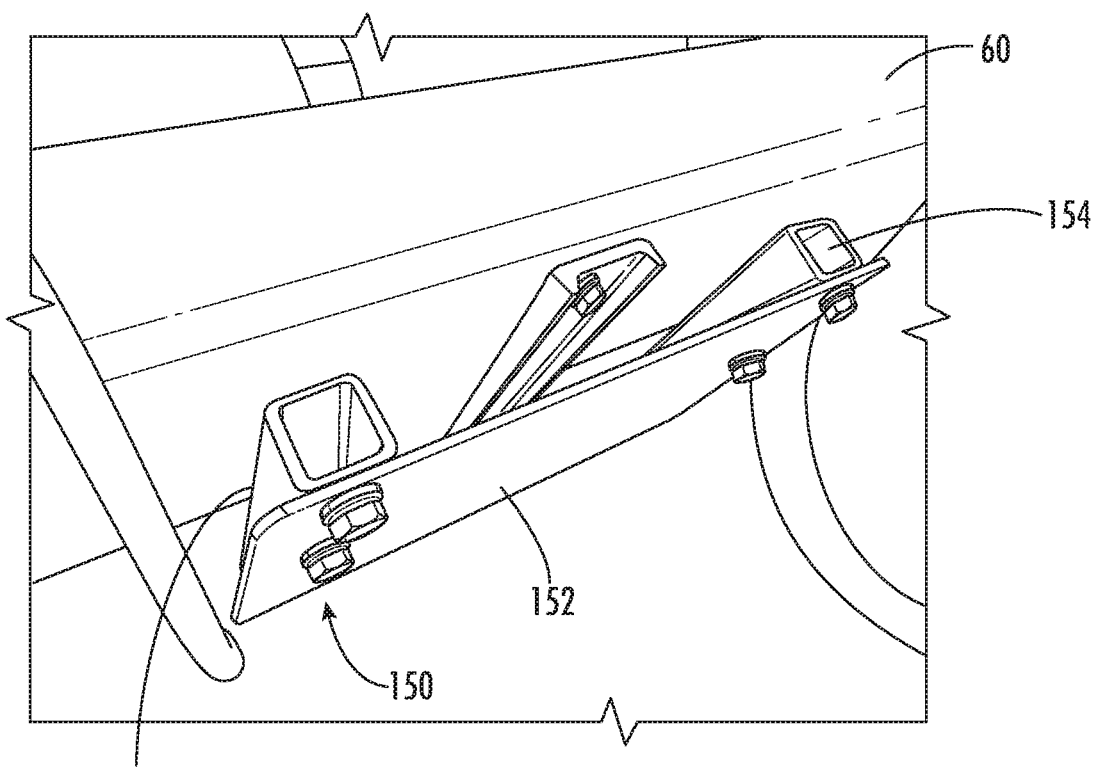
FIG. 16 is another perspective view of the chassis and the mounting plate of FIG. 15.

FIGS. 15-16 illustrate a mounting assembly 150 for a body 58 component. According to an embodiment, the mounting assembly 150 is a mounting plate for a fuel management module. In other embodiments, the mounting assembly 150 may be provided for another body component.

The mounting assembly 150 is connected to an outboard side face of a frame rail 60, and has a mounting plate 152 that is connected to the frame rail 60 via first and second offset members 154. The mounting plate 152 is therefore spaced apart from the outboard face of the frame rail 60, and provides a mounting surface for body components. In one example, the mounting plate 152 may be positioned parallel to the outboard face of the frame rail 60. By offsetting the mounting plate 152 from the frame rail, the body builder or another third party can drill, weld, or otherwise make modifications to the mounting plate 152 while the underlying frame rail 60 remains intact and untouched based on the clearance provided by the offset members 154. Additionally, the risk of cutting into any harnesses and lines running under the frame rails 60 is eliminated by providing an offset mounting assembly 150 that is removed from the frame rail 60 itself.

In various embodiments and with reference to FIGS. 8-16, various combinations of tie down brackets, guide brackets, and other mounting brackets and/or rear attachment points may be provided onto the frame rail 60 for the body 58, and may have the shapes and positioning along the frame rails 60 as shown, or may have another shape and/or position along the frame rails 60 to cooperate with another body to mount the body to the chassis 56. Other brackets for body 58 components may likewise be connected to the frame rails 60, for example, mounting brackets for a body hydraulic tank, a body fuse box, and the like.

The brackets, rear cross-members, body mounts, and mounting assemblies as shown are connected to the frame rails 60 via fasteners such as fasteners 134, 144 extending through the apertures 116 formed in the frame rails 60. According to various embodiments, the fasteners used in connecting the brackets and cross-members to the frame rails 60 are lockbolts, and in a further example are provided as HUCK bolt fasteners. A HUCK bolt fastener has a collar that is swaged to the threads of the bolt to provide a permanent and vibration resistant fastening. The use of the lockbolts (or HUCK bolt fasteners) is generally preferred over welding so as to avoid jeopardizing the overall structural integrity of the frame rails 60.

Conventionally, and as stated above, a body builder would drill and mount brackets onto a heat-treated frame rail, or alternatively, directly weld brackets onto the heat-treated frame rail after receipt of a cab chassis from the cab chassis OEM in order to fit a body.

At step 160, various chassis components are assembled and installed onto the frame rails 60. Examples of chassis components include the transmission, driveline components, braking systems, and the like.

Figure 17:
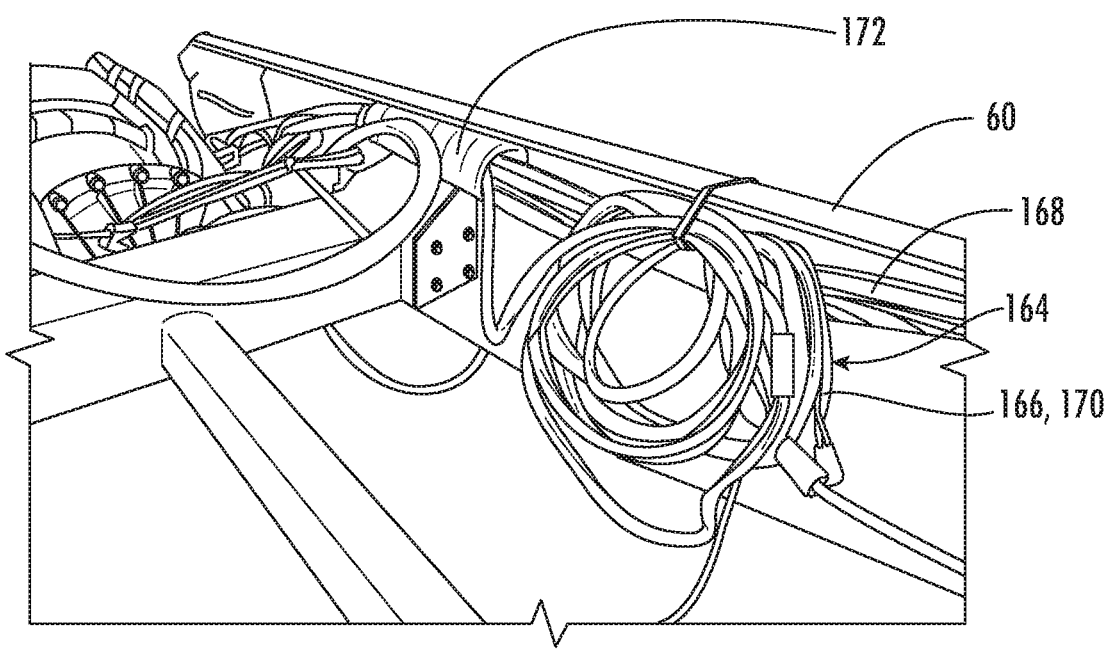
FIG. 17 is a partial perspective view of a chassis with a body wiring harness according to an embodiment and assembled using the method of FIG. 5.
Figure 18:
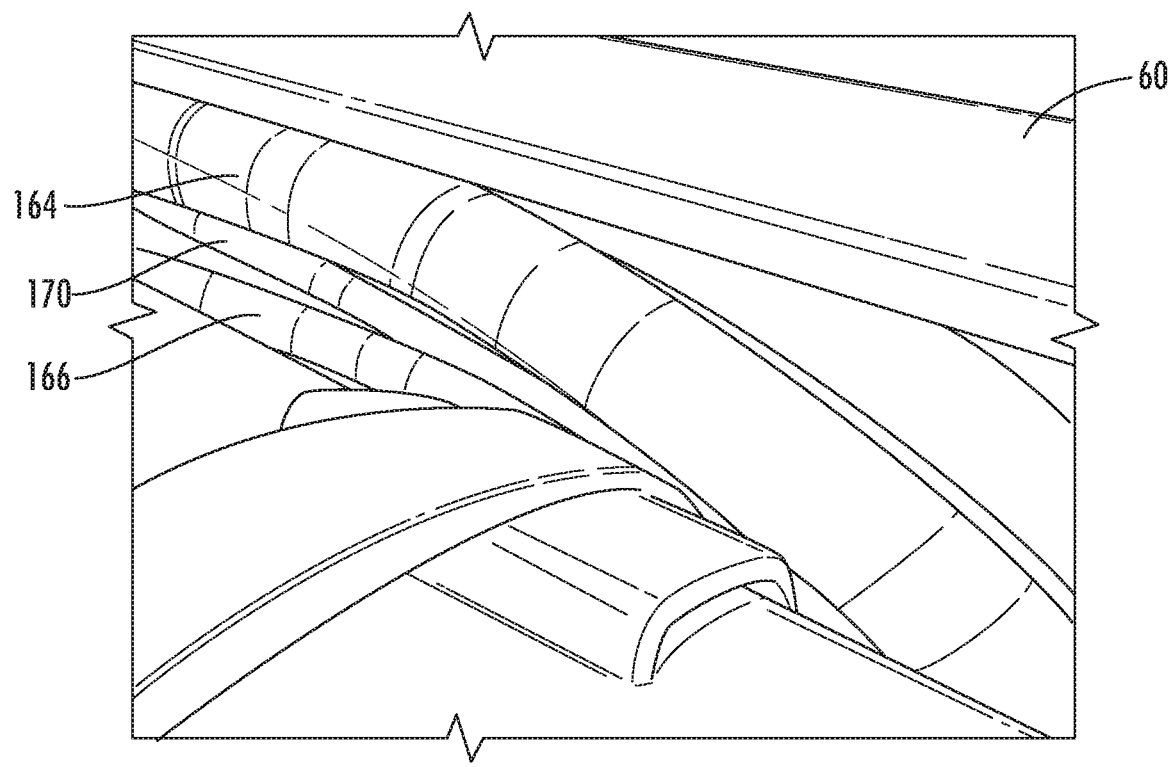
FIG. 18 is a partial perspective view of the vehicle wiring harness and the body wiring harness under a frame rail and adjacent to another chassis component according to an embodiment and assembled using the method of FIG. 5.
Figure 19:
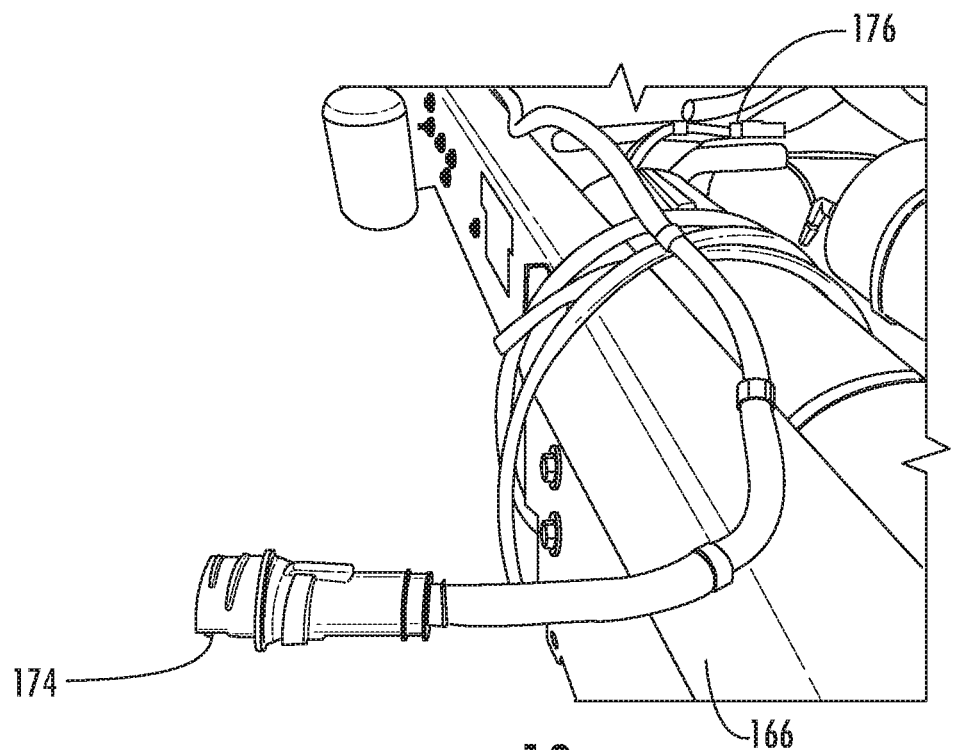
FIG. 19 is a partial perspective view of a chassis with another body wiring harness having first and second connectors according to another embodiment and assembled using the method of FIG. 5.

At step 162, the vehicle wiring harness 164 (or chassis-side vehicle wiring harness) and the body wiring harness 166 (or chassis-side body wiring harness) are installed onto the chassis 56. Additionally, any pneumatic lines 168 are also installed onto the chassis. The pneumatic lines may be provided for use with the chassis, for use with the body, or for use with the chassis and the body. FIGS. 17-19 illustrate wiring harnesses 164, 166, pneumatic lines 168, and sensor cables 170 for the body 58 that are installed by the chassis OEM via step 162.

According to one embodiment, and as described herein, the chassis and the cab are assembled in separate sub-assembly lines, and then are connected during a final assembly for the cab chassis. As such, the vehicle and body wiring harnesses, and other cable or pneumatic connections that extend from the cab 54 to the chassis 56 are each split into a cab-side harness and a chassis-side harness. The cab-side harness and the connection between the cab-side and chassis-side harnesses for each of the body and vehicle harnesses are described below with respect to steps 200, 250, and 300.

Conventionally, a body builder would install body wiring harnesses, additional pneumatic lines, and other cables for sensors or cameras after the cab chassis had been completed by the chassis OEM. The body builder would often use a single wiring harness that extends from the cab into the chassis. The body builder would have to cut, splice or otherwise connect the body electrical wiring harness into the electrical system for the cab chassis. Likewise, the body builder would need to cut, plumb into, or otherwise access the chassis pneumatic system when installing a body pneumatic line or system.

Additionally, the body builder needed to fit the body harness through locations with limited physical space on the chassis when fitting the body. As shown in FIG. 18, there may be limited space between the frame rails 60 and associated chassis components, and the body builder may need to move or adjust the existing chassis harnesses and lines in order to fit the body harnesses and lines into the limited space. By installing the body wiring harnesses and any body pneumatic lines or cables as described herein with respect to step 162, the body builder merely needs to connect the body 58 to the existing electrical, pneumatic, or other connectors provided on the cab chassis when fitting the body onto the provided mounts and brackets, while the existing chassis electrical and pneumatic systems and associated cable wraps remain untouched and intact, and possible issues with rubbing, interference, and/or puncturing of the electrical cables/harnesses and/or pneumatic hose are reduced or eliminated.

With respect to the chassis-side body electrical harness 166, the chassis OEM either receives a split harness from the body builder (with the harness split for cab-side and chassis-side), or alternatively, will provide a split harness based on the electrical connectors and requirements as provided in a specification from the body builder based on the selected body from the end customer. An example of a split harness is shown below in FIG. 23.

Figure 29:
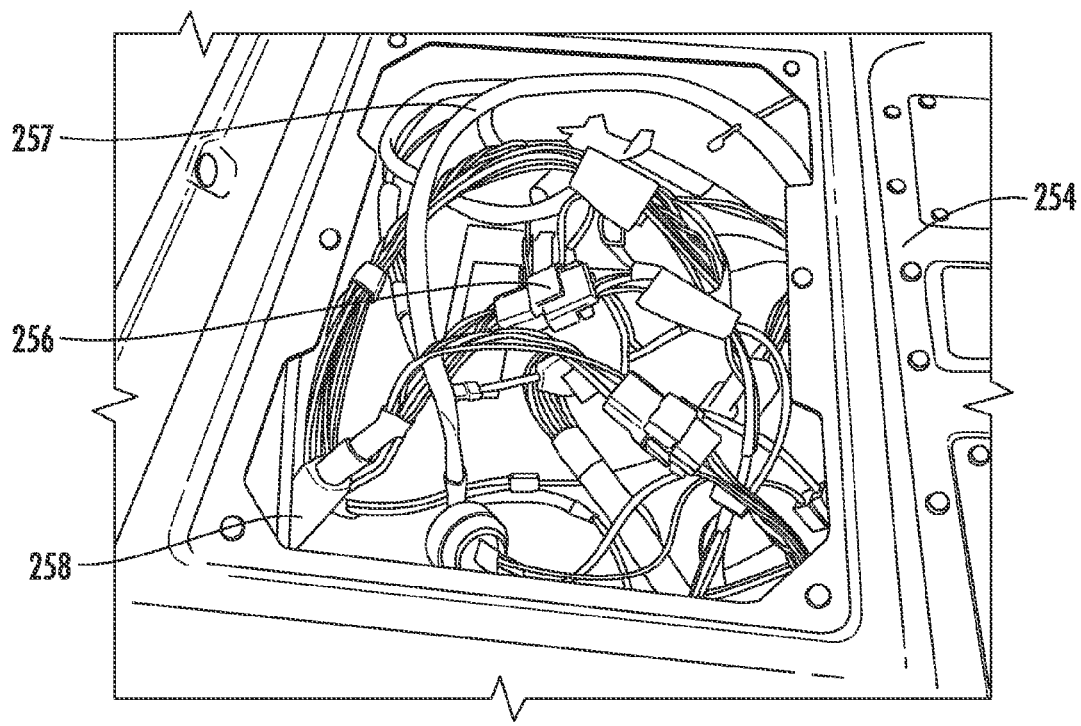
FIG. 29 is a partial perspective view of a cab compartment with body control modules according to an embodiment and installed using the method of FIG. 5.

Referring back to FIGS. 17-19, the chassis-side vehicle wiring harness 164 extends from a forward end of the chassis (adjacent to the cab) to connect to cab-side vehicle harness 257 shown in FIG. 29, and rearward along the frame rails 60 to various connectors as shown in FIGS. 17-19. The chassis-side body wiring harness 166 is additionally connected into the chassis electrical system, e.g. the battery box 72, to provide electrical power to the chassis-side body harness 166.

The chassis-side body wiring harness 166 is bundled and run with the chassis-side vehicle wiring harness 164, and the two harnesses 164, 166 may be shrink wrapped or otherwise bundled together with cable wraps 172 as shown in FIG. 17. FIG. 17 also illustrates additional coiled chassis-side body wiring harness for connection to a body by the body builder with multiple connectors at the end of the wiring harness. As can be seen in FIG. 18, the bundled chassis-side vehicle and chassis harnesses 164, 166 may extend along the frame rail 60 with very limited physical space to run the harnesses.

An end of the chassis-side body harness 166 may be provided with multiple connectors for use by the body builder as shown in FIG. 19. In one example, a body-side harness 166 is provided with two connectors, a first multi-pin connector 174 for direct connection to a body component, and a second connector 176 pigtailed to the harness.

Likewise, the body-side pneumatic system 168 may be provided as a specification to the chassis OEM, and the chassis OEM installs pneumatic lines on the chassis-side for the body, with pneumatic connectors as specified by the body builder or with free-ends for the body builder to attached fittings for connection to the body.

Similarly, the body-side sensor cables 170 may be provided with the bundled wiring harnesses and pneumatic lines, and any camera or other sensor cables for use with cameras and sensors on the body may be installed during this step.

Figure 20:
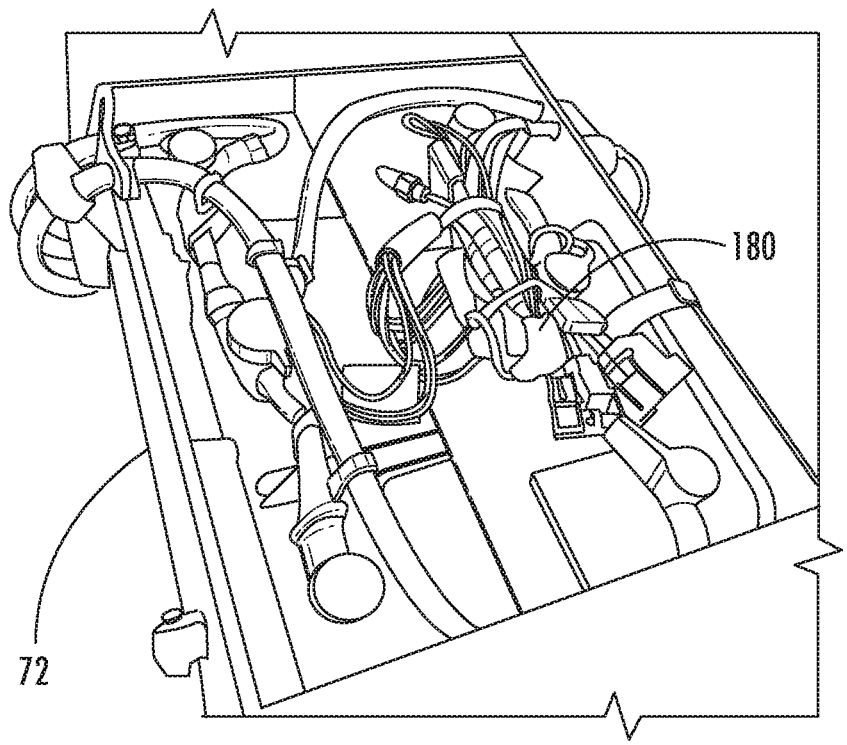
FIG. 20 is a perspective view of a chassis fuse box with additional body fuses according to an embodiment and assembled using the method of FIG. 5.
Figure 21:
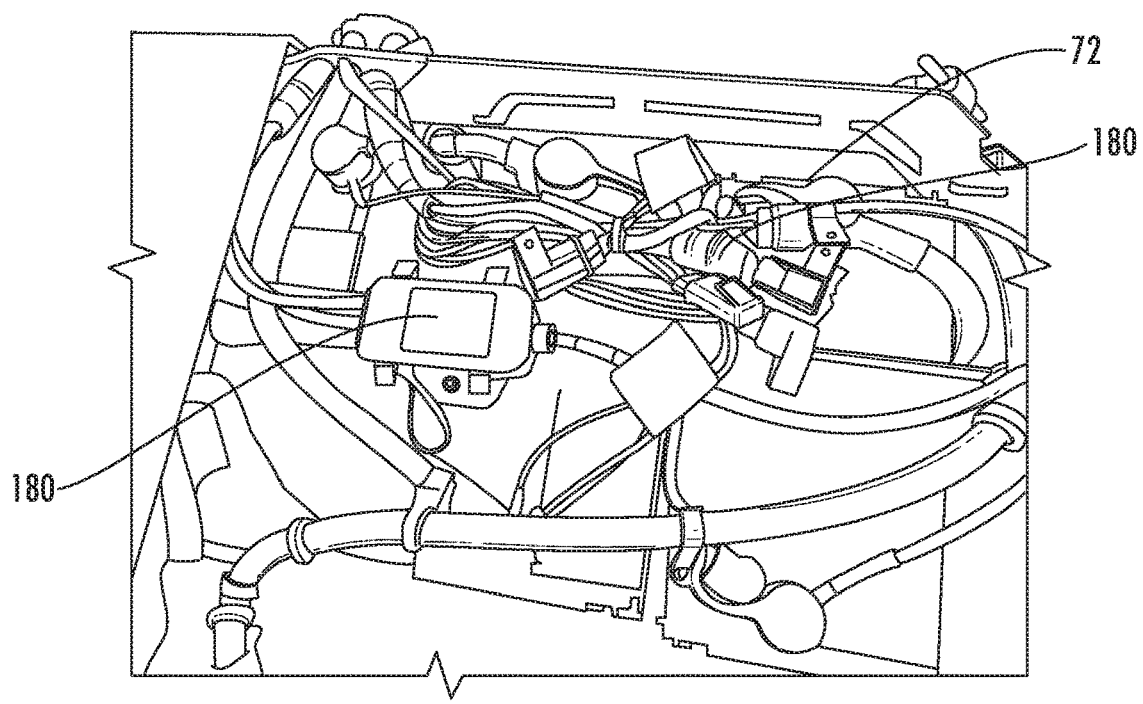
FIG. 21 is another perspective view of the chassis fuse box and body fuses of FIG. 20.

Additionally, at step 162, the chassis OEM may provide and install a body fuse system 180 for use by the body electrical system onto the chassis 56. In one example, and as shown in FIGS. 20-21, a fuse system 180 for the body is provided in the chassis battery box 72. The chassis battery box 72 contains a battery bank for the chassis, and is a component traditionally installed by the cab chassis OEM as it powers components of the vehicle during operation. The chassis battery box 72 is mounted to the frame rail 60, and sufficient space is provided above an upper surface of the batteries to additionally install fuses for the body electrical system and that connect to the body wiring harnesses as described above.

Conventionally, the body builder would install a separate body fuse box onto the chassis. As there is limited space available for mounting a body fuse box in a generally forward location of the chassis, a body fuse box has been conventionally difficult to access for an end user based on the overhang of the body and other surrounding components. For example, a separate body fuse box has conventionally been installed behind the chassis fuse box and under a body overhang, which provides limited or difficult access for maintenance.

Figure 22:
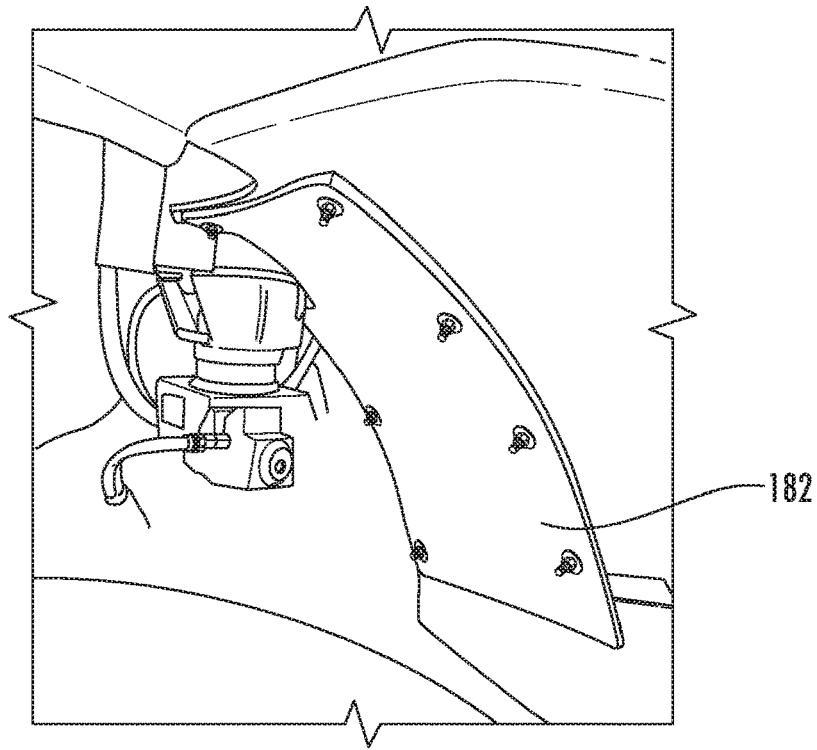
FIG. 22 is a perspective view of a mud flap for a body assembled using the method of FIG. 5.

During the sub-assembly 102, other body components may be connected to the chassis by the cab chassis OEM. For example, mud guards 182 or mud flaps may be connected as shown in FIG. 22.

Steps in sub-assembly 102 are performed before the cab chassis 52 leaves the cab chassis OEM facility. Furthermore, and in some embodiments, steps in sub-assembly 102 may be performed on the chassis 56 and steps in sub-assembly 104 may be performed on the cab 54 before the chassis assembly is attached to the cab assembly in a final assembly process at the cab chassis OEM to form the cab chassis 52.

Referring now to the cab sub-assembly method 104 and at step 200, the cab chassis OEM assembles and installs a cab-side body wiring harness along with the cab-side vehicle wiring harness into a cab 54. FIG. 29 illustrates the cab-side body wiring harness connected to the body control module 256, and the cab-side vehicle wiring harness at 257. The cab 54 may be provided as a body-in-white cab body that has been painted, but otherwise does not have an interior installed.

Conventionally and upon receipt of a cab chassis from the chassis OEM, a body builder would perform the following steps to install the required body components into the cab: (i) generally remove the interior and panels covering compartments in the interior, (ii) cut a hole into the cab to provide a pass through for the continuous wiring harness installed by the body builder, (iii) run the wiring harness along with any other pneumatic lines or sensor cables along the chassis and into the disassembled cab interior and around existing cab components, (iv) drill, cut, or otherwise provide mounting points for switches, control panels, displays, and/or other user interfaces associated with the body in the cab, and (v) reinstall the interior of the cab. According to the present disclosure, the cab chassis OEM assembles and installs split vehicle and body wiring harnesses and cables for both the cab chassis 52 as well as the body 58, and also installs user interfaces for the selected body before the interior has been installed and before the chassis 56 is connected to the cab 54.

Figure 23:
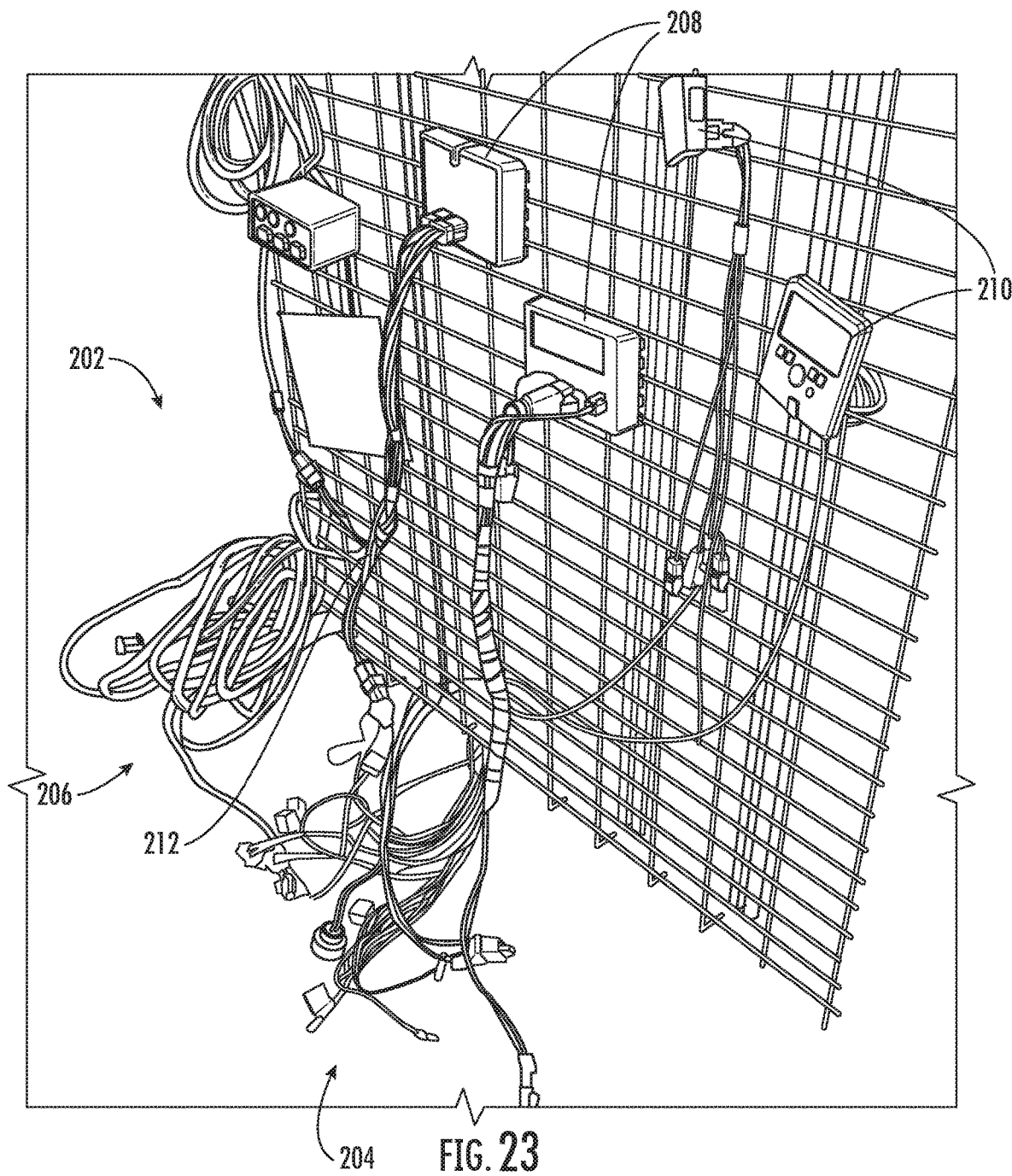
FIG. 23 is a perspective view of a cab-side and chassis-side body wiring harness according to an embodiment and for installation using the method of FIG. 5.

FIG. 23 illustrates a body wiring harness 202 according to a first embodiment, and includes both the cab-side 204 and the chassis-side 206 of the body harness which may provide harness 166 described above. The body wiring harness 202 includes wiring harnesses as well as sensor cables, control modules 208, and the user interfaces 210 for controlling or monitoring the body 58 functions for installation into the cab 54 interior. The cab-side body harness 204 connects to the chassis-side body harness 206 via a connector plate 212. An aperture 214 or hole is provided in the body-in-white of the cab prior to paint, and the connector plate 212 connects to the underside of the cab adjacent to a wheel well (indicated generally at 216 in FIG. 3) to provide a connection point for the cab- and chassis-side body harnesses 204, 206 during a final assembly step between the cab and the chassis.

Figure 24:
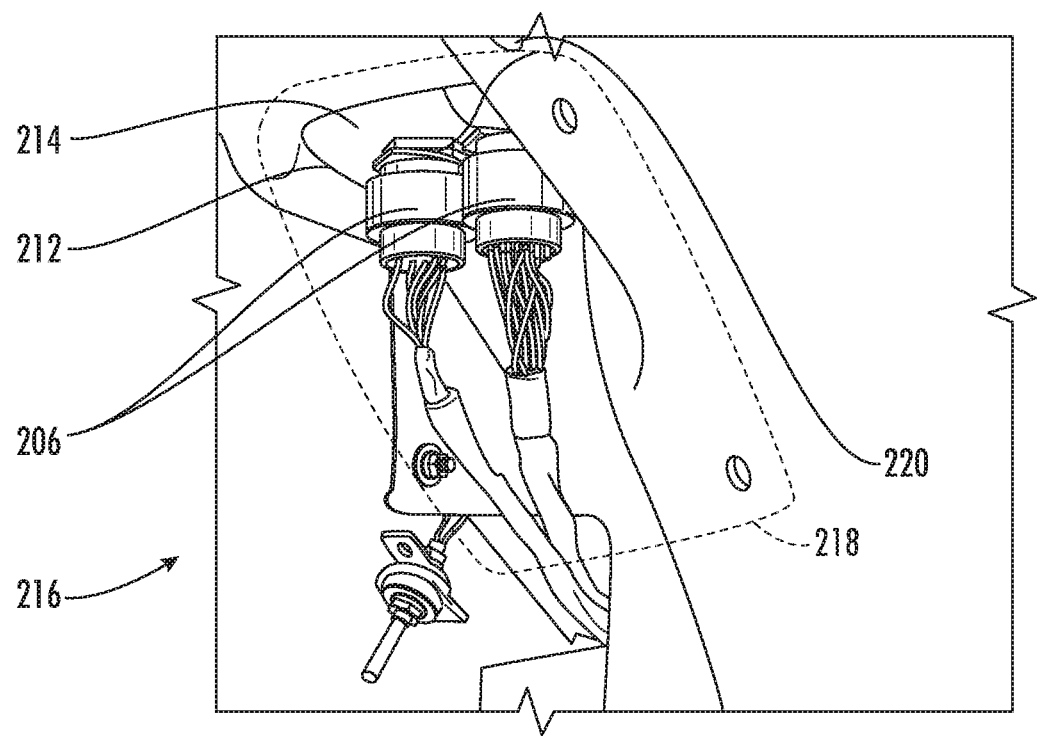
FIG. 24 is a perspective view of a connector plate of the wiring harness of FIG. 23.

FIG. 24 illustrates the connector plate 212 installed to an underside of the cab 54 with the chassis-side body wiring harness 206 connected to the connector plate 212. The connector plate 212 has a series of apertures associated with the various cables and connections that are required to pass into the cab. In each aperture, a fitting may be provided to cooperate with the ends of the chassis-side and cab-side harness or cable to connect the two. Alternatively, the cab-side and chassis-side harnesses may have male and female connectors that directly couple to one another through the apertures in the plate 212. The connector plate provides a sealed interface between interior and exterior of the cab 54, and further provides a secure pass through for the harnesses and cables. The chassis-side harnesses and cables may be connected to the connector plate or to the cab-side harnesses upon final assembly of the chassis to the cab by the chassis OEM at step 300.

The connector plate 212 may be located adjacent to a wheel well 216 of the cab. As such, a sealing member 218 (shown schematically) may be connected using fasteners to apertures 220 shown in a cab panel. The sealing member 218 may be provided as a sheet of a weatherproof material such as a synthetic rubber or the like, and provides an additional layer of protection for the electrical and harness connections from moisture, road debris, and the like.

Figure 25:
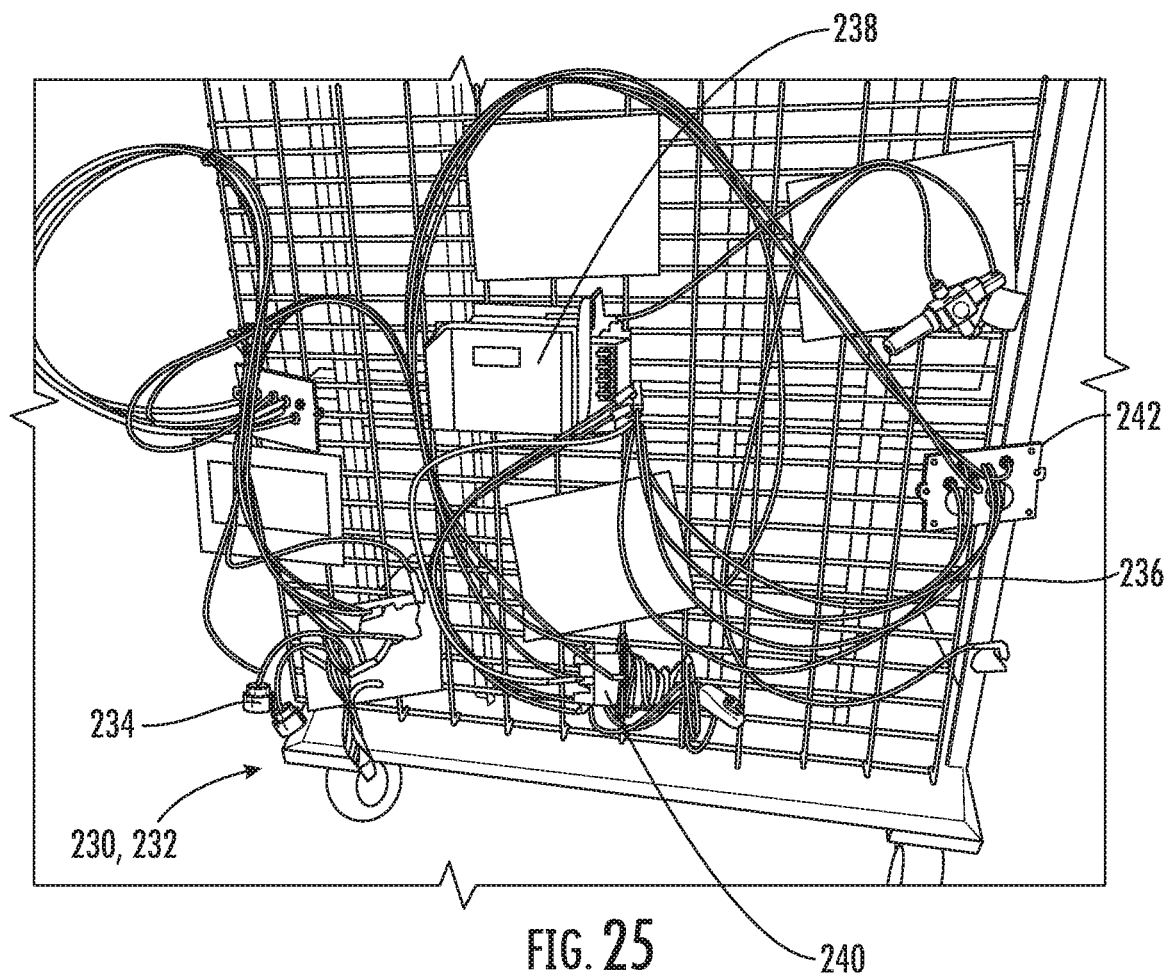
FIG. 25 is a perspective view of a cab-side body harness according to another embodiment and for installation using the method of FIG. 5.

FIG. 25 illustrates a body wiring harness 230 according to a second embodiment, and only the cab-side 232 of the body harness is illustrated. The cab-side body harness 232 includes both wiring harnesses 234 and sensor cables as well as pneumatic lines 236, control modules 238, and the user interfaces 240 for controlling or monitoring the body functions for installation into the cab interior. Note that only a portion of the wiring harness 234 is shown. The cab-side body harness 232 connects to a corresponding the chassis-side body harness via a connector plate 242. An aperture or hole is provided in the body-in-white prior to paint, and the connector plate 242 connects to the cab to provide a connection point for the cab- and body-side harnesses during a final assembly step.

Figure 26:
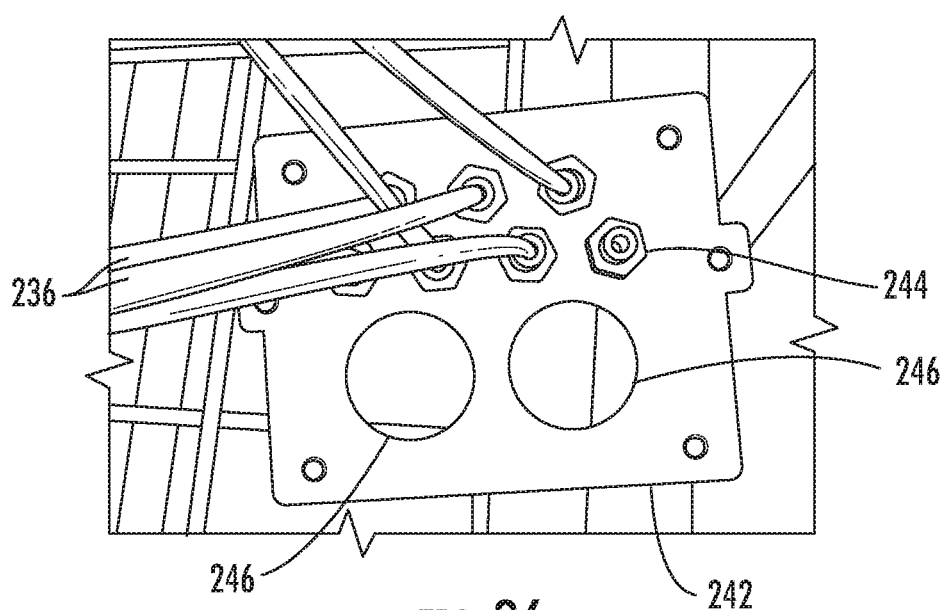
FIG. 26 is a perspective view of the connector plate of the harness of FIG. 25.

FIG. 26 illustrates the connector plate 242 for installation to an underside of the cab 54 with the cab-side body wiring harness 232 connected to the connector plate. The connector plate 242 has a series of apertures associated with the various harnesses, cables, and pneumatic lines that are required to pass into the cab. In each aperture, a fitting may be provided to cooperate with the ends of the chassis-side and body-side harness, cable, or pneumatic line passing therethrough. The pneumatic lines 236 and associated fittings 244 are illustrated in the figure, and the apertures 246 for the body wiring harness connections are also shown. The connector plate 242 provides a sealed interface between interior and exterior of the cab similar to the connector plate described above with respect to FIG. 24, and further provides a secure pass through for the harnesses, cables, and pneumatic lines. The chassis-side harnesses, cables, and pneumatic lines may be connected to the connector plate 242 upon final assembly of the chassis to the cab by the chassis OEM.

At step 250, the connector plate is installed onto the aperture of the cab.

At step 252, the body components, such as the control modules and user interfaces are installed into the interior of the cab by the chassis OEM.

Figure 27:
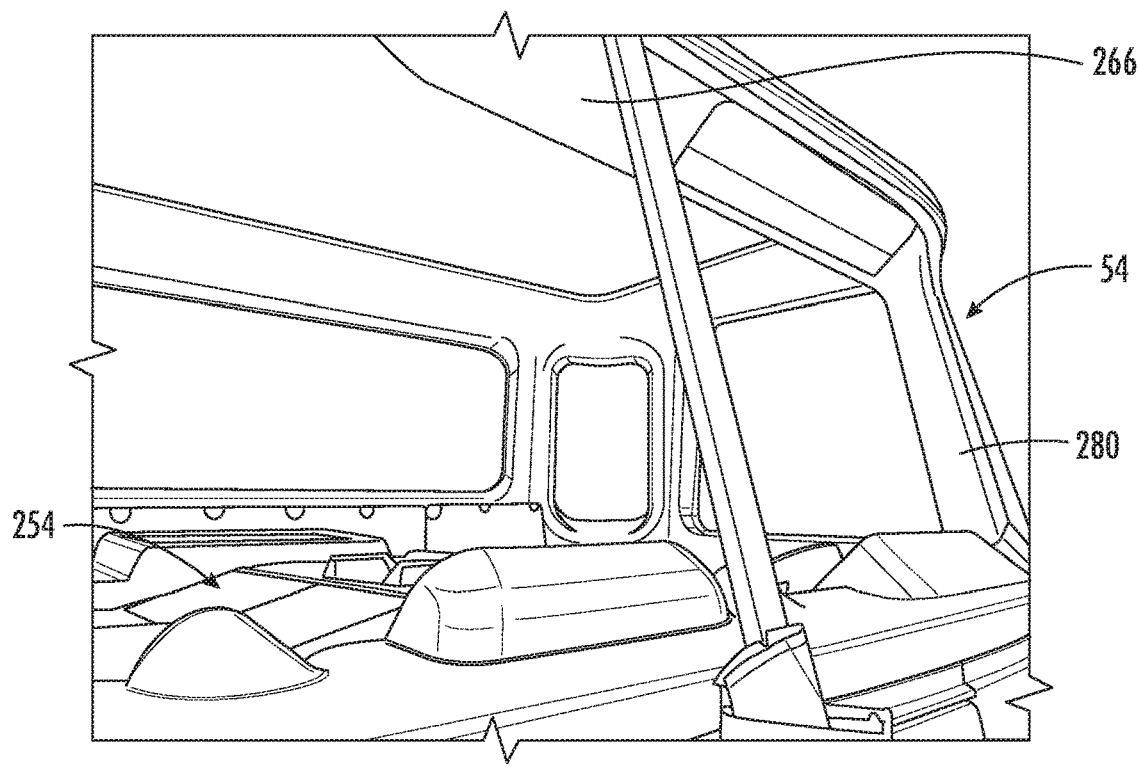
FIG. 27 is a partial perspective view of a partially assembled cab according to an embodiment and for use with the method of FIG. 5.
Figure 28:
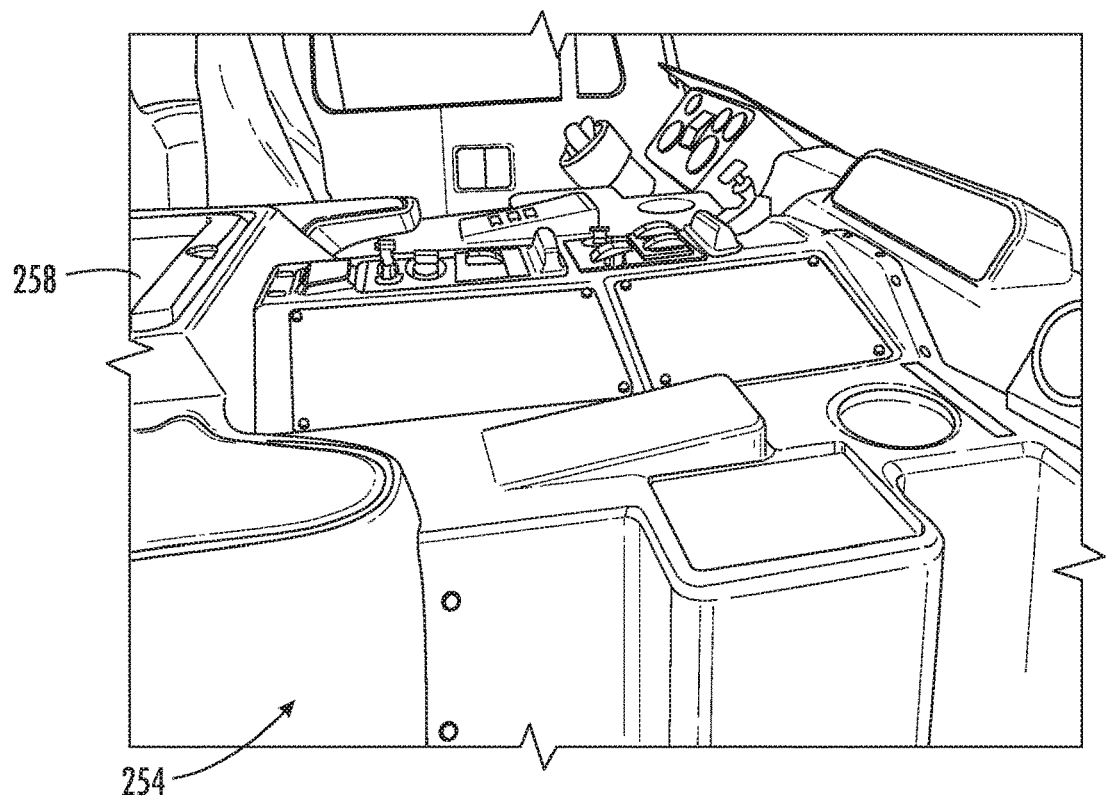
FIG. 28 is a partial perspective view of a cab interior according to an embodiment for use with the method of FIG. 5.

FIGS. 27-28 illustrates a cab 54 with the interior 254 partially installed. The dashboard panels and sub-structure are installed, while seating, safety features, and the headliner have yet to be installed. Conventionally, the panels are provided as panel blanks as shown to the body builder, and the body builder would then make the disassembly, modifications, and reassembly needed to install the body controllers, interfaces, and indicators.

During step 252, and as shown in FIG. 29, the body control modules 256 are installed by the chassis OEM into the cab interior 254, for example, in compartment 258. FIG. 29 additionally illustrates the connectors and wiring harnesses, or the cab-side body wiring harness, associated with the body control modules 256. The cab-side vehicle harness 257 is also shown in FIG. 29, and is connected to and in electrical communication with the chassis-side vehicle harness 164 shown in FIGS. 17-18 when the cab 54 is assembled to the chassis 56.

Figure 30:
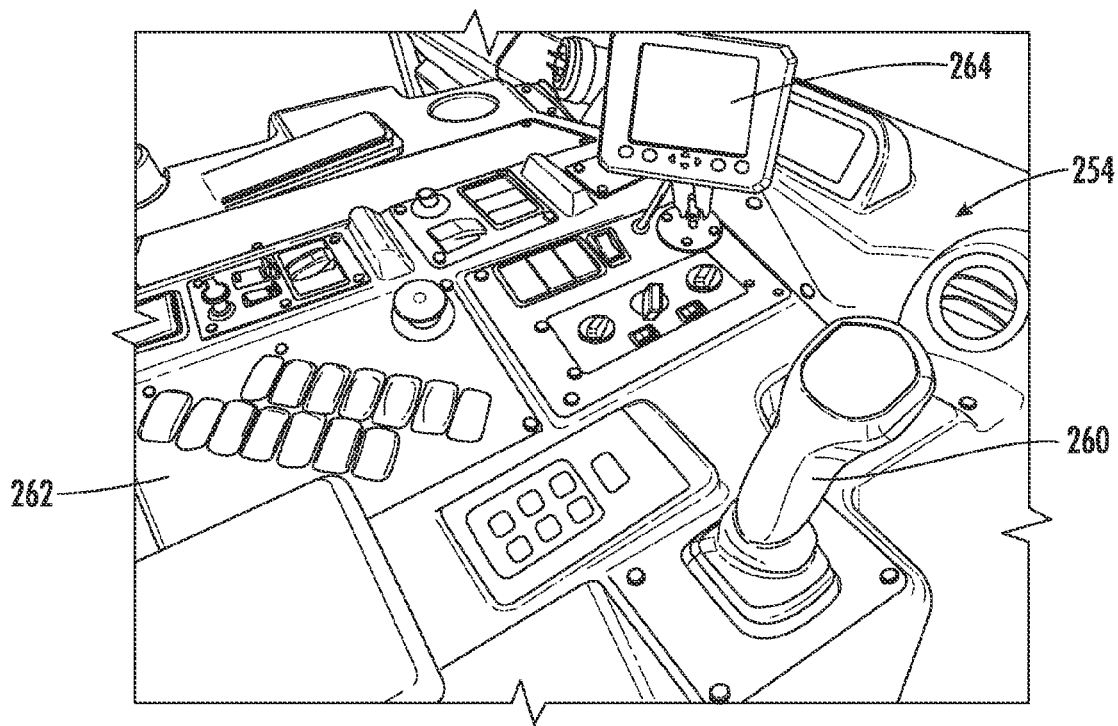
FIG. 30 is a partial perspective view of a control and console panel according to an embodiment and installed using the method of FIG. 5.
Figure 31:
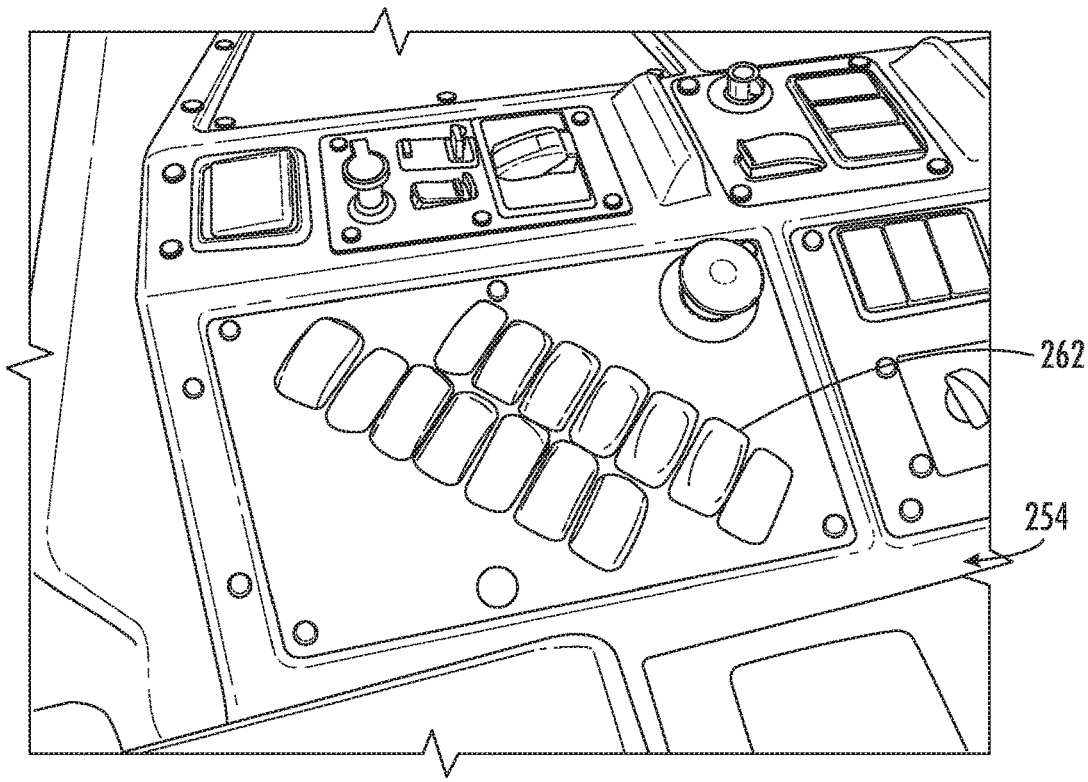
FIG. 31 is a partial perspective view of the switch panel of the panel of FIG. 30.
Figure 32:
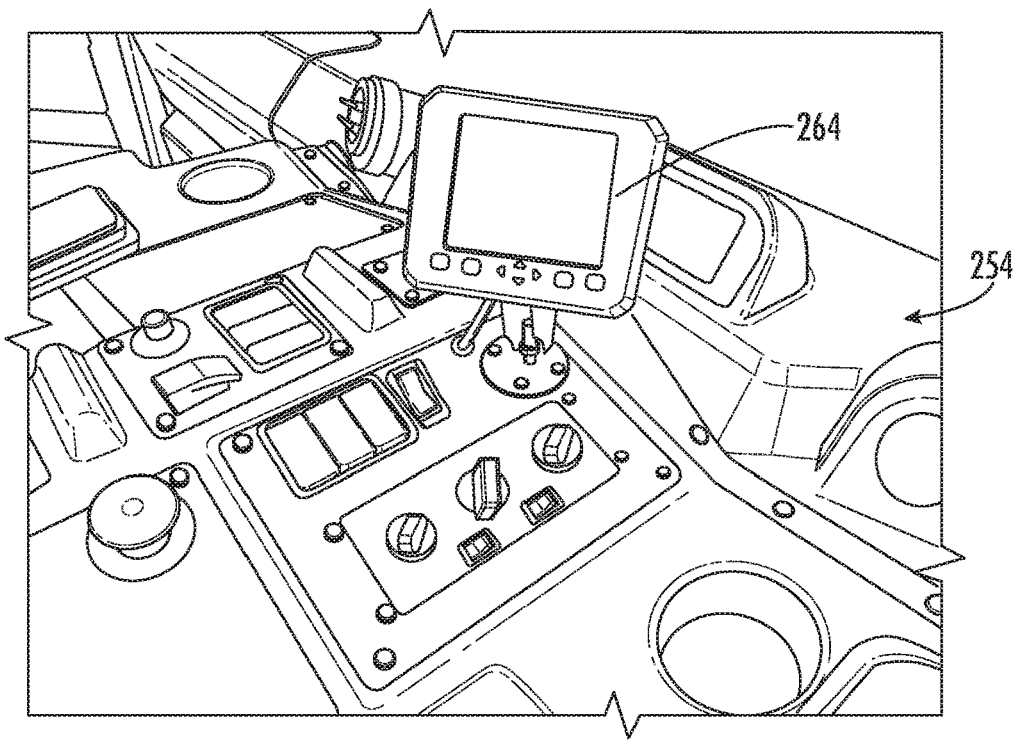
FIG. 32 is a partial perspective view of a display of the panel of FIG. 30.

Additionally during step 252, and as shown in FIG. 30, the chassis OEM also installs the controllers 260, switches 262, and displays 264 or interfaces associated with the body 58 and its functions. According to one example and as shown, a joystick controller 260 is shown, along with a display 264, and a series of switches 262 and indicators. In other examples, other user inputs may be used as a controller in place of the joystick, and electronic or touch screens may be implemented in place of mechanical switches. FIG. 31 illustrates a closer view of the switch panel for the body with assorted lights, switches, and indicators; and FIG. 32 illustrates a closer view of the display for a camera associated with the body. In other examples, a camera display for the body may additionally or alternatively be provided above the windshield by the chassis OEM, for example at mounting point 266 in FIG. 27.

Conventionally, the body builder has had to run the cables for the various switches, displays, and controllers in the dashboard panel and center console and around or through existing cables or wiring associated with the cab or chassis. The body builder conventionally has added holes to the interior for wire pass throughs, as well as mounting points or plates into not only the panel blanks but also into the dash surface for various body components. It is difficult for a body builder to make these modifications, as there may be an existing cab chassis wiring harness or other cab component adjacent to or immediately underneath the desired mounting location for the body component.

Figure 33:
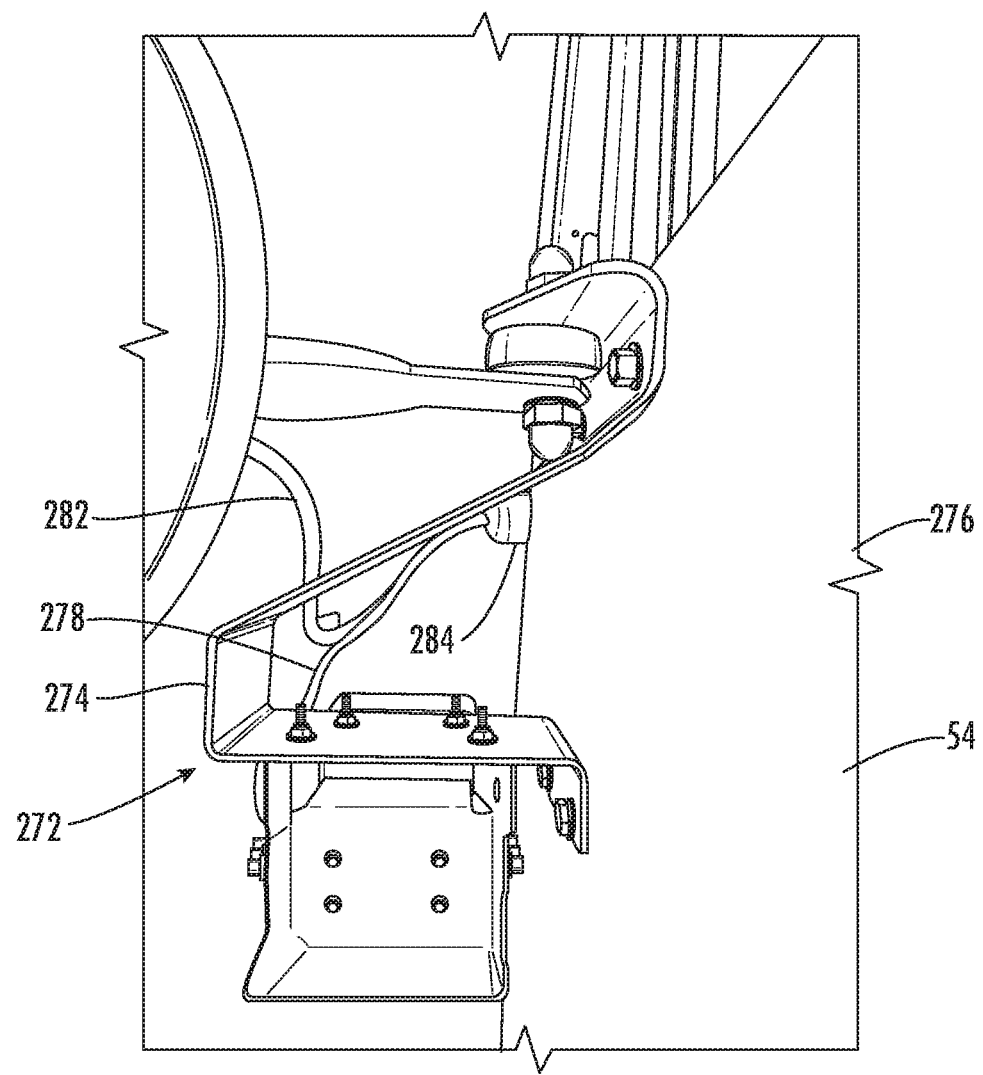
FIG. 33 is a partial perspective view of a cab exterior with a camera kit installed using the method of FIG. 5.

At step 270, an accessory kit 272 such as a camera kit 272 is installed if appropriate for the associated selected body by the chassis OEM and prior to delivery to a body builder. A camera mounted to a camera kit bracket 274 is shown in FIG. 33. In other examples, the accessory kit 272 may be a lighting kit with a work light, or another body accessory requiring power and mounted on an exterior of the cab.

Conventionally, an additional side view camera may be installed with selected bodies by a body builder, and may be installed with the camera on a side exterior surface 276 of the cab and an associated display within the interior of the cab, for example, above the windshield on the roof panel, e.g. at mounting point 266. Conventionally, the body builder has mounted the display to the roof panel, run a camera cable down the center windshield support, added an aperture to the dash and a cab side panel for the cable, and mounted the camera onto the cab exterior.

According to the present disclosure, an additional mounting plate is provided onto the roof panel in the cab interior at mounting point 266, or the display itself is directed mounted by the chassis OEM. A display cable 278 is run from the roof panel, under a headliner, down an A-pillar 280 of the cab and back to the center console underneath any associated trim and to connect to camera controls for the operator. The camera cable 278 also runs under the dashboard panel, and is bundled with the mirror control cable 282 to pass through the side panel 276 of the cab 54. The camera cable 278 and mirror control cable 282 are bundled together and a single weather seal 284 is used. As such, only a single aperture is provided in the cab door for cables 278, 282. The chassis OEM also attaches the mounting plate or bracket 274 to an exterior of the cab 54 for mounting the camera.

When the body builder receives the cab chassis from the chassis OEM, only the camera and the display may need to be connected using the mounting locations and cables as provided and installed by the chassis OEM, and modification of the cab 54 is avoided. Additionally, any mounting holes in the exterior of the cab may be made prior to final paint, and furthermore may be made prior to body-in-white paint.

At step 300, the cab 54 and chassis 56 are connected to one another by the chassis OEM in a final assembly step. As a part of the final assembly, the controls, sensor cables, wiring harnesses, pneumatic lines, and any other required connections are made between the cab and chassis not only for the vehicle, but also for the selected body to be fitted to the chassis at a later date. When the cab 54 is assembled to the chassis 56, the chassis-side body wiring harness is connected to the body-side body wiring harness, e.g. via a connector plate, and the chassis-side vehicle wiring harness 164 is connected to the cab-side vehicle wiring harness 257.

At step 302, the chassis OEM performs end-of-line testing on the cab chassis. The chassis OEM may test the body control modules as well as the cab chassis truck vehicle control modules. The chassis OEM may test the body control modules using a diagnostic protocol, via an end of line tester, to ensure that any electrical controller (i.e., vehicle related controller and body builder related controller), and associated wiring harnesses, sensor, and pneumatic harnesses and connectors are correctly installed and properly functional prior to leaving the chassis OEM and prior to delivery to a body builder facility. The cab chassis OEM may then make any changes to the cab chassis 52 prior to its leaving the OEM facility. Thus, the diagnostic operation as performed at the chassis OEM on the body builder related electrical features may mitigate the need for the body builder to run diagnostics and reduce process steps at the body builder manufacturing facility.

Subassembly steps 102, 104, and steps 300, 302 are performed before the cab chassis leaves the cab chassis OEM facility at delivery step 304. Furthermore, and in some embodiments, steps 102 may be performed on the chassis and steps 104 may be performed on the cab before the chassis assembly is attached to the cab assembly in a final assembly process 300 at the cab chassis OEM.

In further examples, after assembly of the cab to the chassis at step 302 and prior to delivery to an end user at step 304, the OEM may mount the body to the cab chassis and deliver a completed vehicle with the body directly to the end user. In this scenario, the cab chassis is not delivered to or modified by a body builder. The OEM mounts the body the brackets and other fittings provided on the frame rails. The OEM additionally connects the various body components and controls to the cab and chassis, and completes any necessary electrical, pneumatic, or hydraulic connections. Furthermore, the OEM may conduct end-of-line or other diagnostic testing on the body and on the completed vehicle with an installed body.

According to various non-limiting embodiments, the cab chassis OEM assembles the cab chassis 52 with many of the body 58 components pre-installed and incorporated at various stages of the vehicle assembly, which provide associated advantages for the final vehicle 50 product in terms of serviceability, reliability, cost, and time to delivery to the final end user with a body 58 fitted to the cab chassis 52. Conventionally, a body builder has been required to make significant modification, disassembly, and reassembly to a completed cab chassis 52 when fitting a body 58 and prior to customer delivery.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A cab chassis vehicle comprising:
   a cab comprising:
      an outer panel on an underside region of the cab, the outer panel defining an aperture therethrough,
      a connector plate connected to the outer panel and covering the aperture to provide a sealed interface between an interior region of the cab and an exterior region of the cab,
      a sealing sheet connected to an outer surface of the outer panel adjacent to the aperture, the sealing sheet extending over an outer surface of the connector plate to act as a barrier for the connector plate from moisture and road debris,
      a cab-side body wiring harness having an end supported by the connector plate, and
      a cab-side vehicle wiring harness; and
   a chassis connected to the cab, the chassis comprising:
      first and second frame rails, each frame rail having at least one mounting bracket connected thereto via a fastener, each mounting bracket sized to receive a truck body,
      a chassis-side body wiring harness having an end supported by the connector plate and in electrical communication with the cab-side body wiring harness, and
      a chassis-side vehicle wiring harness in electrical communication with the cab-side vehicle harness;
   wherein the chassis-side and cab-side body wiring harnesses are connected to one another, and wherein the chassis-side and cab-side vehicle wiring harnesses are connected to one another.

2. The vehicle of claim 1 wherein the cab further comprises a cab-side body pneumatic line, the cab-side body pneumatic line having an end supported by the connector plate; and
   wherein the chassis further comprises a chassis-side body pneumatic line, the chassis-side body pneumatic line having an end supported by the connector plate such that the chassis-side body pneumatic line is in fluid communication with the cab-side body pneumatic line.

3. The vehicle of claim 1 wherein the cab further comprises:
   a mounting bracket for a body camera connected to an exterior side surface of the cab,
   a cable bundle for the body camera extending through another aperture defined by the exterior side surface of the cab, the cable bundle having a first cable to connect to the body camera and a second cable to connect to a side view mirror of the cab, and
   a weather seal extending around the cable bundle adjacent to the another aperture.

4. The vehicle of claim 1 wherein the chassis further comprises a mounting assembly for a body component, the mounting assembly having a mounting plate connected to an outboard face of the first frame rail via first and second offset members such that the mounting plate is spaced apart from the outboard face.

5. A method of assembling a cab chassis vehicle, the method comprising:
   (i) sub-assembling a chassis by:
      connecting at least one mounting bracket to a frame rail of a chassis via an associated fastener, the mounting bracket sized to receive a truck body,
      installing a chassis-side vehicle wiring harness, and
      installing a chassis-side body wiring harness;
   (ii) sub-assembling a cab by:
      installing a connector plate to cover an aperture on an outer panel of the cab,
      installing a cab-side body wiring harness,
      connecting the cab-side body wiring harness to the connector plate, and
      installing a cab-side vehicle wiring harness; and
   (iii) assembling the cab to the chassis to provide a cab chassis vehicle by:
      connecting the chassis-side body wiring harness to the connector plate, and
      connecting the chassis-side vehicle wiring harness to the cab-side vehicle wiring harness.

6. The method of claim 5 wherein the cab chassis vehicle is a class 7 vehicle or a class 8 vehicle.

7. The method of claim 5 wherein the truck body is one of a refuse truck body, a recycling truck body, a refueling truck body, a crane carrying truck body, a paint striping truck body, a street sweeper truck body, or a concrete pumping body.

8. The method of claim 5 further comprising delivering the cab chassis vehicle to a body builder.

9. The method of claim 5 further comprising installing a sealing member to cover the connector plate, the sealing member installed onto an outer surface of the outer panel of the cab.

10. The method of claim 5 further comprising installing a cab-side body pneumatic line when sub-assembling the cab;

connecting the cab-side body pneumatic line to the connector plate when sub-assembling the cab;
installing a chassis-side body pneumatic line when sub-assembling the chassis; and
connecting the chassis-side body pneumatic line to the connector plate when assembling the cab chassis vehicle.

11. The method of claim 5 further comprising connecting a rear cross-member between associated frame rails when sub-assembling the chassis, the rear cross-member configured to mount to the truck body.

12. The method of claim 5 further comprising providing the frame rail with an aperture sized to receive the fastener for the mounting bracket when sub-assembling the chassis, the aperture being formed prior to heat treating and painting the frame rail.

13. The method of claim 5 further comprising providing the frame rail with a chamfered profile on a rear end of the frame rail when sub-assembling the chassis, the chamfered profile being formed prior to heat treating and painting the frame rail.

14. The method of claim 5 wherein the fastener is a HUCK bolt fastener.

15. The method of claim 5 further comprising connecting a mounting plate for a body component to an out-board side of the frame rail when sub-assembling the chassis, the mounting plate connected to the frame rail via first and second offset members such that the mounting plate is spaced apart from the frame rail.

16. The method of claim 5 further comprising installing a body control module, and at least one body control switch into a cab interior when sub-assembling the cab.

17. The method of claim 5 further comprising installing a cab interior when sub-assembling the cab after installation of the cab-side body wiring harness and cab-side vehicle wiring harness.

18. The method of claim 5 further comprising connecting a mounting bracket for a body camera onto an exterior side surface of the cab when sub-assembling the cab;
passing a cable bundle through an aperture defined by the exterior side surface of the cab when sub-assembling the cab, the cable bundle with a cable to connect to the body camera and a cable to connect to a side view mirror of the cab; and
installing a weather seal around the cable bundle when sub-assembling the cab.

19. The method of claim 5 further comprising wrapping the chassis-side vehicle wiring harness and the chassis-side body wiring harness into a cable bundle when sub-assembling the chassis.

20. The method of claim 5 further comprising providing the chassis-side body wiring harness with a first connector to connect to the truck body and a second connector pigtailed to the chassis-side body wiring harness and adjacent to the first connector.

21. The method of claim 5 wherein the chassis-side and cab-side body wiring harnesses are independent from and not connected to the chassis-side and cab-side vehicle wiring harnesses.

* * * * *